(12) United States Patent
Li et al.

(10) Patent No.: US 11,419,135 B2
(45) Date of Patent: *Aug. 16, 2022

(54) UPLINK CONTROL INFORMATION TRANSMISSION METHOD, ACCESS NETWORK DEVICE, AND TERMINAL DEVICE

(71) Applicant: Huawei Technologies Co., Ltd., Shenzhen (CN)

(72) Inventors: Shengyu Li, Beijing (CN); Jiafeng Shao, Beijing (CN); Lei Guan, Beijing (CN); Yongxia Lyu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,014

(22) Filed: Mar. 8, 2021

(65) Prior Publication Data

US 2021/0227565 A1 Jul. 22, 2021

Related U.S. Application Data

(63) Continuation of application No. 16/925,110, filed on Jul. 9, 2020, now Pat. No. 10,966,234, which is a
(Continued)

(30) Foreign Application Priority Data

Jan. 12, 2018 (CN) .......................... 201810032650.2
Feb. 13, 2018 (CN) .......................... 201810150700.7

(51) Int. Cl.
*H04W 72/12* (2009.01)
*H04L 5/00* (2006.01)

(52) U.S. Cl.
CPC ....... *H04W 72/1284* (2013.01); *H04L 5/0007* (2013.01); *H04L 5/0042* (2013.01); *H04L 5/0044* (2013.01); *H04L 5/0053* (2013.01)

(58) Field of Classification Search
CPC ......... H04W 72/1284; H04W 72/0413; H04W 72/0406; H04L 5/0007; H04L 5/0042;
(Continued)

(56) References Cited

U.S. PATENT DOCUMENTS 9,520,984 B2 * 12/2016 Yang .................... H04L 1/18
2016/0044617 A1 2/2016 Vajapeyam et al.
(Continued)

FOREIGN PATENT DOCUMENTS

CN 101919196 A 12/2010
CN 102870387 A 1/2013
(Continued)

OTHER PUBLICATIONS

3GPP TS 38.213 V15.0.0 (Dec. 2017), 3rd Generation Partnership Project; Technical Specification Group Radio Access Network; NR; Physical layer procedures for control (Release 15), Jan. 3, 2018, 56 pages.
(Continued)

*Primary Examiner* — Wutchung Chu
(74) *Attorney, Agent, or Firm* — Slater Matsil, LLP

(57) ABSTRACT

This application discloses communications apparatuses, to resolve a problem that joint coding and transmission cannot be performed in a scenario in which PUCCH resources of SRs are not aligned with a PUCCH resource of a HARQ/CSI in time domain. The apparatus is enable to execute comprises: receiving a second UCI on a second PUCCH without receiving a first UCI on the first PUCCH, the first UCI comprising HARQ information, and the second UCI comprising a SR; wherein a time domain position of the second
(Continued)

PUCCH overlaps a time domain position of the first PUCCH, a priority of the second UCI is higher than a priority of the first UCI, the priority of the second UCI is a priority of a resource configuration corresponding to the second UCI, and the priority of the second UCI is greater than or equal to a first threshold.

15 Claims, 18 Drawing Sheets

Related U.S. Application Data continuation of application No. PCT/CN2019/071478, filed on Jan. 11, 2019.

(58) Field of Classification Search
CPC ... H04L 5/0044; H04L 5/0053; H04L 5/0057; H04L 5/0055
See application file for complete search history.

(56) References Cited

U.S. PATENT DOCUMENTS

| | | | |
|---|---|---|---|
| 2016/0094996 A1* | 3/2016 | Xiong | H04W 72/0446 370/329 |
| 2017/0013563 A1* | 1/2017 | Yang | H04W 52/146 |
| 2017/0142666 A1* | 5/2017 | Shimezawa | H04L 1/1893 |
| 2017/0223694 A1* | 8/2017 | Han | H04W 52/281 |
| 2018/0310257 A1* | 10/2018 | Papasakellariou | H04W 52/50 |
| 2018/0324787 A1* | 11/2018 | Yin | H04L 5/0053 |
| 2019/0028975 A1* | 1/2019 | Nory | H04L 1/1861 |
| 2019/0098580 A1* | 3/2019 | Babaei | H04W 52/367 |
| 2019/0159134 A1* | 5/2019 | Wang | H04L 5/0094 |
| 2019/0215126 A1* | 7/2019 | Choi | H04W 72/0413 |
| 2019/0246416 A1* | 8/2019 | Park | H04W 72/1278 |
| 2019/0364519 A1* | 11/2019 | Fu | H04W 52/365 |
| 2020/0008227 A1* | 1/2020 | Lee | H04L 5/02 |
| 2020/0036501 A1* | 1/2020 | Gao | H04W 72/0493 |
| 2020/0196343 A1* | 6/2020 | Marinier | H04L 1/1896 |
| 2020/0280427 A1* | 9/2020 | Liu | H04L 5/0053 |
| 2020/0329832 A1* | 10/2020 | Wang | H04W 52/346 |
| 2020/0367265 A1* | 11/2020 | Wang | H04W 76/27 |
| 2021/0068130 A1* | 3/2021 | Liu | H04W 72/1268 |
| 2022/0078768 A1* | 3/2022 | El Hamss | H04L 1/1812 |

FOREIGN PATENT DOCUMENTS

| | | |
|---|---|---|
| CN | 103283169 A | 9/2013 |
| CN | 106664520 A | 5/2017 |
| CN | 107210794 A | 9/2017 |
| CN | 110431905 A | 11/2019 |
| CN | 111096024 A | 5/2020 |
| EP | 2525541 A2 | 11/2012 |
| EP | 2806593 A1 | 11/2014 |
| EP | 3471489 A1 | 4/2019 |
| WO | 2016011405 A1 | 1/2016 |
| WO | 2016048522 A1 | 3/2016 |
| WO | 2017105158 A1 | 6/2017 |
| WO | 2020041269 A1 | 2/2020 |

OTHER PUBLICATIONS

3GPP TS 38.321 V15.0.0 (Dec. 2017), 3rd Generation Partnership Project; Technical Specification Group Radio Access Network; NR; Medium Access Control (MAC) protocol specification (Release 15), Jan. 4, 2018, 55 pages.

Babaei et al. U.S. Appl. No. 62/563,916, filed Sep. 27, 2017 (Year: 2017).

Lee et al. U.S. Appl. No. 62/580,965, filed Nov. 2, 2017 (Year: 2017).

Papasakellariou U.S. Appl. No. 62/564,508, filed Sep. 28, 2017 (Year: 2017).

Samsung, "Procedures for UL Transmissions", 3GPP TSG RAN WG1 Meeting NR#3, R1-1716007, Sep. 18-21, 2017, 4 pages, Nagoya, Japan.

Etri: "UCI multiplexing of different usage scenario", 3GPP TSG RAN WG1 Meeting 91, R1-1720226, Nov. 27-Dec. 1, 2017, 3 pages, Reno, USA.

Ericsson, "Summary of Contributions on PUCCH Structure for Short Duration", 3GPP TSG RAN WG1 Meeting#91, R1-1721448, Nov. 27-Dec. 1, 2017, 17 pages, Reno, Nevada.

Lenovo, Motorola Mobility, "Multiplexing of SR and HARQ-ACK", 3GPP TSG RAN WG1 Meeting AH 1801, R1-1800396, Jan. 22-26, 2018, 4 pages, Vancouver, Canada.

Huawei, HiSilicon, "SR procedure in NR", 3GPP TSG-RAN2 Meeting #99bis, R2-1710109, Oct. 9-13, 2017, 6 pages, Prague, Czech Republic.

* cited by examiner

UPLINK CONTROL INFORMATION TRANSMISSION METHOD, ACCESS NETWORK DEVICE, AND TERMINAL DEVICE

CROSS-REFERENCE TO RELATED APPLICATIONS

This application is a continuation of U.S. patent application Ser. No. 16/925,110, filed on Jul. 9, 2020, which is a continuation of International Application No. PCT/CN2019/071478, filed on Jan. 11, 2019, which claims priority to Chinese Patent Application No. 201810032650.2, filed on Jan. 12, 2018, and claims priority to Chinese Patent Application No. 201810150700.7, filed on Feb. 13, 2018. The disclosures of the aforementioned applications are hereby incorporated by reference in their entireties.

TECHNICAL FIELD

Embodiments of this application relate to the field of communications technologies, and in particular, to an uplink control information transmission method, an access network device, and a terminal device.

BACKGROUND

In a 5G communications system, to reduce an uplink data transmission latency and support a plurality of scheduling request configurations, an access network device may associate different logical channels with scheduling requests (SR) having different configurations, and may allocate, by allocating the different logical channels to different services, the SRs having the different configurations to the different services. For example, the access network device allocates an SR having a higher priority to a latency-sensitive service. A terminal device may indicate a reliability requirement, a latency requirement, and the like on an uplink data service to the access network device by using the SRs having the different configurations, so that the access network device allocates an appropriate uplink transmission resource to the terminal device based on an actual service requirement of the terminal device, to provide excellent uplink service transmission experience for a user.

In the prior art, in a scenario that is shown in FIG. 1 and in which physical uplink control channel (PUCCH) resources of SRs are aligned with a PUCCH resource of a hybrid automatic repeat request (HARQ)/channel state information (CSI) in time domain, that is, in a scenario in which time domain positions of the PUCCH resources for carrying the SRs are aligned with a time domain position of the PUCCH resource for carrying the HARQ/CSI, if the terminal device needs to transmit a plurality of SRs at the time domain position, the terminal device always selects an SR having a higher priority to perform joint coding and transmission on the SR and the HARQ/CSI.

However, in the prior art, a solution to how to perform joint coding and transmission in a scenario in which PUCCH resources of SRs are not aligned with a PUCCH resource of a HARQ/CSI in time domain is not provided, affecting uplink data transmission.

SUMMARY

Embodiments of this application provide an uplink control information transmission method, an access network device, and a terminal device, to resolve a prior-art problem that joint coding and transmission cannot be performed in a scenario in which PUCCH resources of SRs are not aligned with a PUCCH resource of a HARQ/CSI in time domain.

To achieve the foregoing objective, the following technical solutions are used in the embodiments of this application.

According to a first aspect, an uplink control information transmission method is disclosed, and includes: A time domain position of a first uplink control channel PUCCH is determined, where the first PUCCH is used to carry first uplink control information (UCI), and the first UCI includes a HARQ and/or CSI. Then, N second PUCCHs are determined based on a time window corresponding to the time domain position of the first PUCCH. Specifically, the N second PUCCHs correspond to M resource configurations. Both N and M are integers greater than or equal to 2, or both N and M are integers greater than or equal to 1, and N is greater than or equal to M. A time domain position of each of the second PUCCHs overlaps with the time window corresponding to the time domain position of the first PUCCH, where the overlapping includes partial overlapping or complete overlapping. Alternatively, the time window may include the second PUCCH, or the time domain position of the second PUCCH includes the time window. Finally, the first UCI and second UCI may be sent on the first PUCCH. The second UCI corresponds to at least one of the M resource configurations. The second UCI includes SR information.

The resource configuration is used to specify at least one of the following information: a transmission period of the second PUCCH corresponding to the second UCI, an offset in the period, a format of the second PUCCH, a transmission resource index (index number) of the second PUCCH, an index of the resource configuration, and priority information of the resource configuration.

According to the uplink control information transmission method provided in this embodiments of the present application, if a transmission conflict occurs between a plurality of SRs (which may be included in the second UCI described in this embodiment of the present application) having different resource configurations and a HARQ/CSI (which may be included in the first UCI described in this embodiment of the present application), a terminal device may first determine a time window based on the first PUCCH carrying the HARQ/CSI, further, determine N of second PUCCHs used to carry the plurality of SRs having the different resource configurations, and determine the M different resource configurations corresponding to the N second PUCCHs, where the N second PUCCHs overlap the time window. Finally, the terminal device may jointly code and transmit an SR corresponding to at least one of the M resource configurations and the HARQ/CSI. It can be learned that in the method provided in this embodiment of the present application, a time domain range in which an SR may be transmitted is defined based on the time window. In this way, in a scenario in which time domain positions of SRs are not aligned with a time domain position of a HARQ/CSI, some SRs may be selected based on the time window, to jointly code and transmit the SRs and the HARQ/CSI.

With reference to the first aspect, in a first possible implementation of the first aspect, when both N and M are integers greater than or equal to 2, the at least one resource configuration is at least one of the M resource configurations that has a highest priority; or the at least one resource configuration is at least one of resource configurations that has a highest priority, where the resource configurations correspond to second UCI that is in a positive state and that is in second UCI corresponding to the M resource configurations.

When a transmission conflict occurs between SRs having a plurality of resource configurations, an SR corresponding to a resource configuration having a higher priority is preferentially transmitted, to ensure, as much as possible, that a data transmission service having a higher priority is not affected, and provide a high-quality uplink data transmission service for a user.

With reference to the first possible implementation of the first aspect, in a second possible implementation of the first aspect, when both N and M are integers greater than or equal to 2, priorities of the M resource configurations may be configured by a higher layer or predefined, or may be determined based on one or more of the following information: transmission periods corresponding to the M resource configurations, formats of the second PUCCHs corresponding to the M resource configurations, time domain resources occupied by the second PUCCHs corresponding to the M resource configurations, resource configuration indexes corresponding to the M resource configurations, indexes of logic channel groups corresponding to the M resource configurations, and priorities of the logic channel groups corresponding to the M resource configurations.

Specifically, shorter transmission periods corresponding to the M resource configurations indicate higher priorities of the resource configurations. The formats of the second PUCCHs are a short type and a long type, and a priority of a resource configuration corresponding to a short PUCCH is higher than that of a resource configuration corresponding to a long PUCCH. There is a correspondence between the resource configuration indexes and the resource configuration priorities, and a larger resource configuration index indicates a higher priority of a resource configuration, or a larger resource configuration index indicates a lower priority of a resource configuration. An earlier time domain resource occupied by a second PUCCH corresponding to a resource configuration indicates a higher priority of the resource configuration; a shorter time domain resource occupied by the second PUCCH corresponding to the resource configuration indicates a higher priority of the resource configuration. There is a correspondence between the indexes of the logic channel groups corresponding to the resource configurations and the priorities of the resource configurations, and the corresponding priorities of the resource configurations may be determined based on the indexes of the logic channel groups. The priorities of the logic channel groups corresponding to the resource configurations may alternatively be used as the priorities of the resource configurations.

With reference to any one of the first aspect or the possible implementations of the first aspect, in a third possible implementation of the first aspect, when both N and M are integers greater than or equal to 2, the N second PUCCHs partially overlap or do not overlap in time domain.

The method provided in this embodiment of the present application is used to resolve a problem of how to perform joint coding when PUCCHs carrying SRs are not aligned with a PUCCH carrying a HARQ/CSI and a transmission conflict occurs between the SRs and the HARQ/CSI, and in particular, to resolve a problem of how to perform joint coding when the PUCCHs carrying the SRs are in complete or partial time-division mode in time domain.

With reference to any one of the first aspect or the possible implementations of the first aspect, in a fourth possible implementation of the first aspect, the time window corresponding to the time domain position of the first PUCCH is aligned with the time domain position of the first PUCCH; the time window is aligned with a time domain position of a time unit in which the first PUCCH is located; or the time window is aligned with a time domain position of an uplink transmission part in a time unit in which the first PUCCH is located.

In this embodiment of the present application, when PUCCH resources of the plurality of SRs having the different configurations are not aligned with a PUCCH resource of the HARQ/CSI in time domain, the time window corresponding to the time domain position of the first PUCCH carrying the HARQ/CSI may be used as a reference standard, to select an SR, where the SR and the HARQ/CSI are jointly coded and transmitted. This resolves a problem that the SRs and the HARQ/CSI cannot be jointly coded and transmitted in a scenario in which the PUCCH resources of the SRs are not aligned with the PUCCH resource of the HARQ/CSI in time domain.

With reference to any one of the first aspect or the possible implementations of the first aspect, in a fifth possible implementation of the first aspect, when both N and M are integers greater than or equal to 2, sending the first UCI and the second UCI that corresponds to the at least one resource configuration on the first PUCCH specifically includes: jointly coding the first UCI and state information and/or index information of the second UCI corresponding to the at least one resource configuration, and sending the coded information on the first PUCCH.

The state information is used to indicate whether the second UCI is in a positive state or a negative state, or may be used to indicate whether an SR included in the second UCI is in a positive state or a negative state. The index information is used to indicate an index of the resource configuration corresponding to the second UCI in a plurality of resource configurations reserved by an access network device for the terminal device, or is used to indicate an index of the resource configuration corresponding to the second UCI in a plurality of resource configurations supported by the terminal device, and is used to indicate an index of the resource configuration corresponding to the second UCI in the M resource configurations. The index information is indicated to the access network device, to ensure that the access network device can make clear which resource configuration is selected by the terminal device, and learn of whether an actual service requirement of the terminal device is latency sensitive or latency insensitive.

With reference to any one of the first aspect or the possible implementations of the first aspect, in a sixth possible implementation of the first aspect, when both N and M are integers greater than or equal to 2, the jointly coding the first UCI and state information and/or index information of the second UCI corresponding to the at least one resource configuration, and sending the coded information on the first PUCCH includes: adding the state information of the second UCI corresponding to the at least one resource configuration after or before the first UCI, to obtain to-be-sent information bits, and sending the to-be-sent information bits on the first PUCCH; adding the index information of the second UCI corresponding to the at least one resource configuration after or before the first UCI, to obtain to-be-sent information bits, and sending the to-be-sent information bits on the first PUCCH; adding the state information and the index information of the second UCI corresponding to the at least one resource configuration after or before the first UCI, to obtain to-be-sent information bits, and sending the to-be-sent information bits on the first PUCCH; and/or sending, by the terminal device, the first UCI on the first PUCCH, where a reference signal sequence on the first PUCCH is used to indicate index information of the second UCI corresponding to the at least one resource configuration, or a cyclic shift of a reference signal on the first PUCCH is used to indicate index information of the second UCI corresponding to the at least one resource configuration.

During specific implementation, the state information and the index information may be explicitly or implicitly indicated, so that the access network device can make clear which resource configuration is selected by the terminal device.

With reference to the first aspect, in a seventh possible implementation of the first aspect, when both N and M are integers greater than or equal to 1, the first PUCCH occupies L continuous time domain resources in L time units in time domain, and the L continuous time domain resources respectively belong to the L time units. The time unit may be a slot, or may be another time unit such as a subframe or a mini slot. The L continuous time domain resources in the L time units have a same start position and length. In a possible implementation, separately sending the first UCI on the L continuous time domain resources in the L time units via the first PUCCH includes: separately coding and transmitting the first UCI on the L continuous time domain resources in the L time units, where the L continuous time domain resources in the L time units each carry a redundancy version obtained after the first UCI is coded, and the redundancy versions obtained after the first UCI is coded are different or the same; or separately representing the first UCI by using different sequences, and separately transmitting the first UCI.

With reference to any one of the first aspect or the possible implementations of the first aspect, in an eighth possible implementation of the first aspect, when both N and M are integers greater than or equal to 1, separately sending the first UCI and the second UCI that corresponds to the at least one resource configuration on the first PUCCH specifically includes: jointly coding the first UCI and the state information and/or the index information of the second UCI corresponding to the at least one resource configuration, and separately sending the coded information on the L continuous time domain resources that are in the L time units and that are occupied by the first PUCCH. The at least one resource configuration may be one resource configuration. In addition, descriptions of the state information and the index information are the same as the foregoing descriptions. An interpretation of joint coding the first UCI and the state information and/or the index information of the second UCI is the same as the foregoing description. The state information and/or the index information of the second UCI may be added before or after a position of information bits of the first UCI, and the joint information bits are coded. The separately sending the coded information on the L continuous time domain resources that are in the L time units and that are occupied by the first PUCCH includes separately sending different or same redundancy versions of the jointly coded information bits on the L continuous time domain resources.

A specific implementation includes: (1) The terminal device may always select an SR resource configuration having a highest priority, and add, to all first PUCCHs in the L time units, state information of an SR corresponding to the resource configuration, to transmit the state information. In this case, only one bit is added before or after a position of information bits of the HARQ/CSI to indicate a state of the SR having the highest priority. (2) The terminal device may alternatively always select an SR resource configuration that is in a positive state and that has a highest priority, and add, to the first PUCCH, index information of an SR corresponding to the resource configuration, to transmit the index information. In this case, $\lceil \log_2 M \rceil$ bits are required to indicate the index information of the SR, where M represents a quantity of second UCI resource configurations corresponding to the second PUCCHs overlapping the first PUCCH. (3) The terminal device may further use $\lceil \log_2(M+1) \rceil$ bits to indicate state information and index information of SRs corresponding to M SR resource configurations, where one state indicates that all the SRs are in a negative state, M other states indicate that M SRs are in a positive state successively, and M represents a quantity of second UCI resource configurations corresponding to the second PUCCHs overlapping the first PUCCH.

With reference to any one of the first aspect or the possible implementations of the first aspect, when both N and M are integers greater than or equal to 1, in a ninth possible implementation of the first aspect, the terminal device sends the first UCI on the first PUCCH, where a cyclic shift of a control information sequence and/or a reference signal sequence on a first time domain symbol occupied by the first PUCCH is used to indicate state information and/or index information of the second UCI corresponding to the at least one resource configuration, and the first time domain symbol is a time domain symbol that is in the continuous time domain resource and on which the first PUCCH overlaps the second PUCCH in time domain. To be specific, the terminal device sends the control information sequence or the reference signal sequence on a time domain symbol other than the first time domain symbol on the first PUCCH in an original manner, adjusts the cyclic shift of the control information sequence and/or the reference signal sequence on the first time domain symbol, and uses a different cyclic shift to indicate the state information and/or the index information of the second UCI corresponding to the at least one resource configuration.

With reference to the first aspect or the ninth possible implementation of the first aspect, in a tenth possible implementation of the first aspect, when both N and M are integers greater than or equal to 1, the cyclic shift of the control information sequence and/or the reference signal sequence on the first time domain symbol is used to indicate, in the following two implementations, the state information and/or the index information of the second UCI corresponding to the at least one resource configuration:

(1) When a quantity of resource configurations corresponding to all second PUCCHs corresponding to the first time domain symbol is 1, if state information of second UCI corresponding to the resource configuration is a negative state, the cyclic shift of the control information sequence or the reference signal sequence on the first time domain symbol remains unchanged, and is an original cyclic shift for sending the control information sequence or the reference signal sequence on the first time domain symbol of the first PUCCH; if the state information of the second UCI corresponding to the resource configuration is a positive state, 1 or C is added to the cyclic shift of the control information sequence or the reference signal sequence on the first time domain symbol, where C is not greater than a threshold, and the threshold is a value obtained by subtracting 1 from a maximum sequence cyclic shift value that can be supported by control information and reference signals.

(2) When a quantity of resource configurations corresponding to all second PUCCHs corresponding to the first time domain symbol is M, if all state information of second UCI corresponding to the M resource configurations is a negative state, the cyclic shift of the control information sequence or the reference signal sequence on the first time domain symbol remains unchanged, and is an original cyclic shift for sending the control information sequence or the reference signal sequence on the first time domain symbol of the first PUCCH; if state information of second UCI corresponding to an $m^{th}$ resource configuration is a positive state, m or m*C is added to the cyclic shift of the control information sequence or the reference signal sequence on the first time domain symbol, where m or m*C is not greater than the threshold (a value obtained by subtracting 1 from the maximum sequence cyclic shift value that can be supported by control information and reference signals). Herein, when m or m*C is added to the cyclic shift of the control information sequence or the reference signal sequence on the first time domain symbol, it indicates that the second UCI corresponding to the $m^{th}$ resource configuration in the M resource configurations is in a positive state, and a state of second UCI corresponding to another resource configuration is unknown.

According to a second aspect, an uplink control information transmission method is disclosed, and includes: First, an access network device determines a time domain position of a first uplink control channel PUCCH, where the first PUCCH is used to carry first uplink control information UCI, and the first UCI includes a HARQ and/or CSI; then the access network device receives, on the first PUCCH, the first UCI and second UCI that are sent by a terminal device, where the second UCI includes scheduling request SR information; further, the access network device may determine N second PUCCHs, where the N second PUCCHs correspond to M resource configurations, both N and M are integers greater than or equal to 2, or both N and M are integers greater than or equal to 1, N is greater than or equal to M, and it should be noted that a time domain position of each of the second PUCCHs overlaps a time window corresponding to the time domain position of the first PUCCH; finally, the access network device may determine at least one of the M resource configurations that corresponds to the second UCI.

The embodiments of the present application provide an uplink control information transmission method. If a transmission conflict occurs between a plurality of SRs (which may be included in second UCI described in the embodiments of the present application) having different resource configurations and a HARQ/CSI (which may be included in first UCI described in the embodiments of the present application), a terminal device may first determine a time window based on a first PUCCH carrying the HARQ/CSI, and further determine N of second PUCCHs used to carry the plurality of SRs having the different resource configurations, where the N second PUCCHs overlap the time window, and determine M different resource configurations corresponding to the N second PUCCHs. Finally, the HARQ/CSI and an SR corresponding to at least one of the M resource configurations may be jointly coded and transmitted. It can be learned that in the method provided in the embodiments of the present application, a time domain range in which an SR may be transmitted is defined based on the time window, so that in a scenario in which time domain positions of SRs are not aligned with a time domain position of a HARQ/CSI, some SRs may be selected based on the time window, to jointly code and transmit the SRs and the HARQ/CSI.

With reference to the second aspect, in a first possible implementation of the second aspect, when both N and M are integers greater than or equal to 1, the first PUCCH occupies one continuous time domain resource in one time unit in time domain, or the first PUCCH occupies L continuous time domain resources in L time units in time domain, and the L continuous time domain resources respectively belong to the L time units. The time unit may be a slot, or may be another time unit such as a subframe or a mini slot. The L continuous time domain resources in the L time units have a same start position and length.

With reference to the second aspect or the first possible implementation of the second aspect, in a second possible implementation of the second aspect, when both N and M are integers greater than or equal to 2, receiving, on the first PUCCH, the first UCI and the second UCI that are sent by the terminal device includes: receiving the first UCI and state information of the second UCI on the first PUCCH; receiving the first UCI and state information and index information of the second UCI on the first PUCCH; or receiving the first UCI on the first PUCCH, and determining index information of the second UCI based on a reference signal sequence on the first PUCCH or a cyclic shift of a reference signal on the first PUCCH. When both N and M are integers greater than or equal to 1, receiving, on the first PUCCH, the first UCI and the second UCI that are sent by the terminal device includes: receiving the first UCI and state information of the second UCI on the first PUCCH; receiving the first UCI and state information and index information of the second UCI on the first PUCCH; receiving the first UCI on the first PUCCH, and determining index information of the second UCI based on a reference signal sequence on the first PUCCH or a cyclic shift of a reference signal on the first PUCCH; or receiving the first UCI on the first PUCCH, and determining state information and/or index information of the second UCI based on a cyclic shift of a control information sequence and/or a reference signal sequence on a first time domain symbol occupied by the first PUCCH. The first time domain symbol is a time domain symbol that is in the continuous time domain resource and on which the first PUCCH overlaps the second PUCCH in time domain.

During specific implementation, the terminal device sends the control information sequence or the reference signal sequence on a time domain symbol other than the first time domain symbol on the first PUCCH in an original manner, adjusts the cyclic shift of the control information sequence and/or the reference signal sequence on the first time domain symbol, and uses a different cyclic shift to indicate the state information and/or the index information of the second UCI corresponding to the at least one resource configuration. In this way, after receiving the first UCI on the first PUCCH, a network device may further determine the state information and/or the index information of the second UCI based on the cyclic shift of the control information sequence and/or the reference signal sequence on the first time domain symbol occupied by the first PUCCH.

In addition, the cyclic shift of the control information sequence and/or the reference signal sequence on the first time domain symbol indicates, in the following three implementations, the state information and/or the index information of the second UCI corresponding to the at least one resource configuration:

(1) If the cyclic shift of the control information sequence or the reference signal sequence on the first time domain symbol is an original cyclic shift for sending the control information sequence or the reference signal sequence on the first time domain symbol of the first PUCCH, it indicates that the second PUCCH corresponding to the first time domain symbol corresponds to one resource configuration, and second UCI corresponding to the resource configuration is in a negative state. Alternatively, it indicates that second PUCCHs corresponding to the first time domain symbol correspond to M resource configurations, and second UCI corresponding to the M resource configurations is in a negative state. M is an integer greater than 1.

(2) If the cyclic shift of the control information sequence or the reference signal sequence on the first time domain symbol is a cyclic shift obtained by adding 1 or C to an original cyclic shift for sending the control information sequence or the reference signal sequence on the first time domain symbol of the first PUCCH, it indicates that the second PUCCH corresponding to the first time domain symbol corresponds to one resource configuration, and second UCI corresponding to the resource configuration is in a positive state.

C is not greater than a threshold, and the threshold is a value obtained by subtracting 1 from a maximum sequence cyclic shift value that can be supported by control information and reference signals.

(3) If the cyclic shift of the control information sequence or the reference signal sequence on the first time domain symbol is a cyclic shift obtained by adding m or m*C to an original cyclic shift for sending the control information sequence or the reference signal sequence on the first time domain symbol of the first PUCCH, it indicates that second PUCCHs corresponding to the first time domain symbol correspond to M resource configurations, and second UCI corresponding to an $m^{th}$ resource configuration in the M resource configurations is in a positive state. A state of second UCI corresponding to another resource configuration is unknown.

m or m*C is not greater than the threshold (a value obtained by subtracting 1 from the maximum sequence cyclic shift value that can be supported by control information and reference signals). The state of the second UCI corresponding to the another resource configuration is unknown.

During specific implementation, the terminal device may explicitly or implicitly indicate state information and index information, so that the access network device may directly obtain the state information and the index information that are sent by the terminal device, or may determine state information and index information by using an indication of other information, to finally make clear which resource configuration is selected by the terminal device.

With reference to the second aspect or the first possible implementation of the second aspect, when both N and M are integers greater than or equal to 2, in a third possible implementation of the second aspect, determining the at least one of the M resource configurations that corresponds to the second UCI includes: determining at least one of the M resource configurations that has a highest priority as the at least one resource configuration corresponding to the second UCI; or determining at least one of the M resource configurations that is indicated by the index information as the at least one resource configuration corresponding to the second UCI.

In other words, the terminal device may always select a resource configuration having a highest priority. In this case, the terminal device does not need to indicate the index information to the access network device, and the access network device may still make clear which resource configuration is selected by the terminal device. The terminal device may select a resource configuration having a highest priority from resource configurations corresponding to SRs in a positive state. In this case, the access network device does not determine which SRs are activated by the terminal device, and therefore does not determine which resource configuration is selected by the terminal device. The terminal device needs to indicate the index information to the access network device, and the access network device determines, based on the index information indicated by the terminal device, which resource configuration is selected by the terminal device.

With reference to any one of the second aspect or the possible implementations of the second aspect, when both N and M are integers greater than or equal to 2, in a fourth possible implementation of the second aspect, priorities of the M resource configurations may be configured by a higher layer or predefined, or may be determined based on one or more of the following information: transmission periods corresponding to the M resource configurations, formats of the second PUCCHs corresponding to the M resource configurations, time domain resources occupied by the second PUCCHs corresponding to the M resource configurations, resource configuration indexes corresponding to the M resource configurations, indexes of logic channel groups corresponding to the M resource configurations, and priorities of the logic channel groups corresponding to the M resource configurations.

Specifically, shorter transmission periods corresponding to the M resource configurations indicate higher priorities of the resource configurations. The formats of the second PUCCHs are a short type and a long type, and a priority of a resource configuration corresponding to a short PUCCH is higher than that of a resource configuration corresponding to a long PUCCH. There is a correspondence between the resource configuration indexes and the priorities of the resource configurations, and a larger resource configuration index indicates a higher priority of a resource configuration, or a larger resource configuration index indicates a lower priority of a resource configuration. An earlier time domain resource occupied by a second PUCCH corresponding to a resource configuration indicates a higher priority of the resource configuration; a shorter time domain resource occupied by the second PUCCH corresponding to the resource configuration indicates a higher priority of the resource configuration. There is a correspondence between the indexes of the logic channel groups corresponding to the resource configurations and the priorities of the resource configurations, and the corresponding priorities of the resource configurations may be determined based on the indexes of the logic channel groups. The priorities of the logic channel groups corresponding to the resource configurations may alternatively be used as the priorities of the resource configurations.

With reference to any one of the second aspect or the possible implementations of the second aspect, in a fifth possible implementation of the second aspect, when both N and M are integers greater than or equal to 2, the N second PUCCHs partially overlap or do not overlap in time domain.

With reference to any one of the second aspect or the possible implementations of the second aspect, in a sixth possible implementation of the second aspect, the time window is aligned with the time domain position of the first PUCCH; the time window is aligned with a time domain position of the time unit in which the first PUCCH is located; or the time window is aligned with a time domain position of an uplink transmission part in the time unit in which the first PUCCH is located.

According to a third aspect, a terminal device is disclosed, and includes: a processing unit, configured to determine a time domain position of a first uplink control channel (PUCCH), where the first PUCCH is used to carry first uplink control information (UCI), and the first UCI includes a hybrid automatic repeat request HARQ and/or channel state information CSI, where the processing unit is further configured to determine N second PUCCHs, where the N second PUCCHs correspond to M resource configurations, both N and M are integers greater than or equal to 2, or both N and M are integers greater than or equal to 1, N is greater than or equal to M, and a time domain position of each of the second PUCCHs overlaps a time window corresponding to the time domain position of the first PUCCH; and a sending unit, configured to send the first UCI and second UCI on the first PUCCH, where the second UCI corresponds to at least one of the M resource configurations, and the second UCI includes scheduling request SR information.

According to the terminal device provided in this embodiment of the present application, if a transmission conflict occurs between a plurality of SRs (which may be included in the second UCI in this embodiment of the present application) having different resource configurations and a HARQ/CSI (which may be included in the first UCI in this embodiment of the present application), the terminal device may first determine a time window based on the first PUCCH carrying the HARQ/CSI, and further determine N of second PUCCHs used to carry the plurality of SRs having the different resource configurations, where the N second PUCCHs overlap the time window, and determine M different resource configurations corresponding to the N second PUCCHs. Finally, the HARQ/CSI and an SR corresponding to at least one of the M resource configurations may be jointly coded and transmitted. It can be learned that in the method provided in the embodiments of the present application, a time domain range in which an SR may be transmitted is defined based on the time window, so that in a scenario in which time domain positions of SRs are not aligned with a time domain position of a HARQ/CSI, some SRs may be selected based on the time window, to jointly code and transmit the SRs and the HARQ/CSI.

With reference to the third aspect, in a first possible implementation of the third aspect, when both N and M are integers greater than or equal to 2, the at least one resource configuration is at least one of the M resource configurations that has a highest priority; or the at least one resource configuration is at least one of resource configurations that has a highest priority, where the resource configurations correspond to second UCI that is in a positive state and that is in second UCI corresponding to the M resource configurations.

With reference to the third aspect or the first possible implementation of the third aspect, in a second possible implementation of the third aspect, when both N and M are integers greater than or equal to 2, priorities of the M resource configurations may be configured by a higher layer or predefined, or may be determined based on one or more of the following information: transmission periods corresponding to the M resource configurations, formats of the second PUCCHs corresponding to the M resource configurations, time domain resources occupied by the second PUCCHs corresponding to the M resource configurations, resource configuration indexes corresponding to the M resource configurations, indexes of logic channel groups corresponding to the M resource configurations, and priorities of the logic channel groups corresponding to the M resource configurations.

With reference to any one of the third aspect or the possible implementations of the third aspect, in a third possible implementation of the third aspect, when both N and M are integers greater than or equal to 2, the N second PUCCHs partially overlap or do not overlap in time domain.

With reference to any one of the third aspect or the possible implementations of the third aspect, in a fourth possible implementation of the third aspect, the time window is aligned with the time domain position of the first PUCCH; the time window is aligned with a time domain position of a time unit in which the first PUCCH is located; or the time window is aligned with a time domain position of an uplink transmission part in a time unit in which the first PUCCH is located.

With reference to any one of the third aspect or the possible implementations of the third aspect, in a fifth possible implementation of the third aspect, the processing unit is specifically configured to jointly code the first UCI and state information and/or index information of the second UCI corresponding to the at least one resource configuration; the sending unit is specifically configured to send the coded information on the first PUCCH.

With reference to any one of the third aspect or the possible implementations of the third aspect, in a sixth possible implementation of the third aspect, when both N and M are integers greater than or equal to 2, the processing unit is specifically configured to: add the state information of the second UCI corresponding to the at least one resource configuration after or before the first UCI, to obtain to-be-sent information bits, and code the to-be-sent information bits; add the index information of the second UCI corresponding to the at least one resource configuration after or before the first UCI, to obtain to-be-sent information bits, and code the to-be-sent information bits; and/or add the state information and the index information of the second UCI corresponding to the at least one resource configuration after or before the first UCI, to obtain to-be-sent information bits, and code the to-be-sent information bits; and/or the terminal device sends the first UCI on the first PUCCH, where a reference signal sequence on the first PUCCH is used to indicate index information of the second UCI corresponding to the at least one resource configuration, or a cyclic shift of a reference signal on the first PUCCH is used to indicate index information of the second UCI corresponding to the at least one resource configuration.

With reference to the third aspect, in a seventh possible implementation of the third aspect, when both N and M are integers greater than or equal to 1, the first PUCCH occupies L continuous time domain resources in L time units in time domain, and the L continuous time domain resources respectively belong to the L time units. The time unit may be a slot, or may be another time unit such as a subframe or a mini slot. The L continuous time domain resources in the L time units have a same start position and length. In a possible implementation, separately sending the first UCI on the L continuous time domain resources in the L time units occupied by the first PUCCH includes: separately coding and transmitting the first UCI on the L continuous time domain resources in the L time units, where the L continuous time domain resources in the L time units each carry a redundancy version obtained after the first UCI is coded, and the redundancy versions obtained after the first UCI is coded are different or the same; or separately representing the first UCI by using different sequences, and separately transmitting the first UCI.

With reference to any one of the third aspect or the possible implementations of the third aspect, in a ninth possible implementation of the third aspect, when both N and M are integers greater than or equal to 1, the processing unit is specifically configured to jointly code the first UCI and the state information and/or the index information of the second UCI corresponding to the at least one resource configuration; the sending unit is specifically configured to separately send the coded information on the L continuous time domain resources that are in the L time units and that are occupied by the first PUCCH. The at least one resource configuration may be one resource configuration. In addition, descriptions of the state information and the index information are the same as the foregoing descriptions. An interpretation of joint coding the first UCI and the state information and/or the index information of the second UCI is the same as the foregoing description. The state information and/or the index information of the second UCI may be added before or after a position of information bits of the first UCI, and the joint information bits are coded. Separately sending the coded information on the L continuous time domain resources that are in the L time units and that are occupied by the first PUCCH includes separately sending different or same redundancy versions of the jointly coded information bits on the L continuous time domain resources.

A specific implementation includes: (1) The terminal device may always select an SR resource configuration having a highest priority, and add, to all first PUCCHs in the L time units, state information of an SR corresponding to the resource configuration, to transmit the state information. In this case, only one bit is added before or after a position of information bits of the HARQ/CSI to indicate a state of the SR having the highest priority. (2) The terminal device may alternatively always select an SR resource configuration that is in a positive state and that has a highest priority, and add, to the first PUCCH, index information of an SR corresponding to the resource configuration, to transmit the index information. In this case, $\lceil \log_2 M \rceil$ bits are required to indicate the index information of the SR, where M represents a quantity of second UCI resource configurations corresponding to the second PUCCHs overlapping the first PUCCH. (3) The terminal device may further use $\lceil \log_2(M+1) \rceil$ bits to indicate state information and index information of SRs corresponding to M SR resource configurations, where one state indicates that all the SRs are in a negative state, M other states indicate that M SRs are in a positive state successively, and M represents a quantity of second UCI resource configurations corresponding to the second PUCCHs overlapping the first PUCCH.

With reference to any one of the third aspect or the possible implementations of the third aspect, in a tenth possible implementation of the third aspect, when both N and M are integers greater than or equal to 1, the sending unit of the terminal device sends the first UCI on the first PUCCH, where a cyclic shift of a control information sequence and/or a reference signal sequence on a first time domain symbol occupied by the first PUCCH is used to indicate state information and/or index information of the second UCI corresponding to the at least one resource configuration, and the first time domain symbol is a time domain symbol that is in the continuous time domain resource and on which the first PUCCH overlaps the second PUCCH in time domain. To be specific, the terminal device sends the control information sequence or the reference signal sequence on a time domain symbol other than the first time domain symbol on the first PUCCH in an original manner, adjusts the cyclic shift of the control information sequence and/or the reference signal sequence on the first time domain symbol, and uses a different cyclic shift to indicate the state information and/or the index information of the second UCI corresponding to the at least one resource configuration.

With reference to the third aspect or the tenth possible implementation of the third aspect, in an eleventh possible implementation of the third aspect, when both N and M are integers greater than or equal to 1, the cyclic shift of the control information sequence and/or the reference signal sequence on the first time domain symbol is used to indicate, in the following two implementations, the state information and/or the index information of the second UCI corresponding to the at least one resource configuration:

(1) When a quantity of resource configurations corresponding to all second PUCCHs corresponding to the first time domain symbol is 1, if state information of second UCI corresponding to the resource configuration is a negative state, the cyclic shift of the control information sequence or the reference signal sequence on the first time domain symbol remains unchanged, and is an original cyclic shift for sending the control information sequence or the reference signal sequence on the first time domain symbol of the first PUCCH; if the state information of the second UCI corresponding to the resource configuration is a positive state, 1 or C is added to the cyclic shift of the control information sequence or the reference signal sequence on the first time domain symbol, where C is not greater than a threshold, and the threshold is a value obtained by subtracting 1 from a maximum sequence cyclic shift value that can be supported by control information and reference signals.

(2) When a quantity of resource configurations corresponding to all second PUCCHs corresponding to the first time domain symbol is M, if all state information of second UCI corresponding to the M resource configurations is a negative state, the cyclic shift of the control information sequence or the reference signal sequence on the first time domain symbol remains unchanged, and is an original cyclic shift for sending the control information sequence or the reference signal sequence on the first time domain symbol of the first PUCCH; if state information of second UCI corresponding to an $m^{th}$ resource configuration is a positive state, m or m*C is added to the cyclic shift of the control information sequence or the reference signal sequence on the first time domain symbol, where m or m*C is not greater than the threshold (a value obtained by subtracting 1 from the maximum sequence cyclic shift value that can be supported by control information and reference signals). Herein, when m or m*C is added to the cyclic shift of the control information sequence or the reference signal sequence on the first time domain symbol, it indicates that the second UCI corresponding to the $m^{th}$ resource configuration is in a positive state, and a state of second UCI corresponding to another resource configuration is unknown.

According to a fourth aspect, an access network device is disclosed, and includes: a processing unit, configured to determine a time domain position of a first uplink control channel PUCCH, where the first PUCCH is used to carry first uplink control information UCI, and the first UCI includes a HARQ and/or CSI; and a receiving unit, configured to receive, on the first PUCCH, the first UCI and second UCI that are sent by a terminal device, where the second UCI includes SR information, where the processing unit is further configured to determine N second PUCCHs, where the N second PUCCHs correspond to M resource configurations, both N and M are integers greater than or equal to 2, or both N and M are integers greater than or equal to 1, N is greater than or equal to M, and a time domain position of each of the second PUCCHs overlaps a time window corresponding to the time domain position of the first PUCCH; the processing unit is further configured to determine at least one of the M resource configurations that corresponds to the second UCI.

With reference to the fourth aspect, in a first possible implementation of the fourth aspect, when both N and M are integers greater than or equal to 1, the first PUCCH occupies one continuous time domain resource in one time unit in time domain; or the first PUCCH occupies L continuous time domain resources in L time units in time domain, and the L continuous time domain resources respectively belong to the L time units. The time unit may be a slot, or may be another time unit such as a subframe or a mini slot. The L continuous time domain resources in the L time units have a same start position and length.

With reference to the fourth aspect or the first possible implementation of the fourth aspect, in a second possible implementation of the fourth aspect, when both N and M are integers greater than or equal to 2, receiving, on the first PUCCH, the first UCI and the second UCI that are sent by the terminal device includes: receiving the first UCI and state information of the second UCI on the first PUCCH; receiving the first UCI and state information and index information of the second UCI on the first PUCCH; or receiving the first UCI on the first PUCCH, and determining index information of the second UCI based on a reference signal sequence on the first PUCCH or a cyclic shift of a reference signal on the first PUCCH. When both N and M are integers greater than or equal to 1, receiving, on the first PUCCH, the first UCI and the second UCI that are sent by the terminal device includes: receiving the first UCI and state information of the second UCI on the first PUCCH; receiving the first UCI and state information and index information of the second UCI on the first PUCCH; receiving the first UCI on the first PUCCH, and determining index information of the second UCI based on a reference signal sequence on the first PUCCH or a cyclic shift of a reference signal on the first PUCCH; or receiving the first UCI on the first PUCCH, and determining state information and/or index information of the second UCI based on a cyclic shift of a control information sequence and/or a reference signal sequence on a first time domain symbol occupied by the first PUCCH. The first time domain symbol is a time domain symbol that is in the continuous time domain resource and on which the first PUCCH overlaps the second PUCCH in time domain.

During specific implementation, the terminal device sends the control information sequence or the reference signal sequence on a time domain symbol other than the first time domain symbol on the first PUCCH in an original manner, adjusts the cyclic shift of the control information sequence and/or the reference signal sequence on the first time domain symbol, and uses a different cyclic shift to indicate the state information and/or the index information of the second UCI corresponding to the at least one resource configuration. In this way, after receiving the first UCI on the first PUCCH, a network device may further determine the state information and/or the index information of the second UCI based on the cyclic shift of the control information sequence and/or the reference signal sequence on the first time domain symbol occupied by the first PUCCH.

In addition, the cyclic shift of the control information sequence and/or the reference signal sequence on the first time domain symbol indicates, in the following three implementations, the state information and/or the index information of the second UCI corresponding to the at least one resource configuration: (1) If the cyclic shift of the control information sequence or the reference signal sequence on the first time domain symbol is an original cyclic shift for sending the control information sequence or the reference signal sequence on the first time domain symbol of the first PUCCH, it indicates that the second PUCCH corresponding to the first time domain symbol corresponds to one resource configuration, and second UCI corresponding to the resource configuration is in a negative state. Alternatively, it indicates that second PUCCHs corresponding to the first time domain symbol correspond to M resource configurations, and second UCI corresponding to the M resource configurations is in a negative state. M is an integer greater than 1.

(2) If the cyclic shift of the control information sequence or the reference signal sequence on the first time domain symbol is a cyclic shift obtained by adding 1 or C to an original cyclic shift for sending the control information sequence or the reference signal sequence on the first time domain symbol of the first PUCCH, it indicates that the second PUCCH corresponding to the first time domain symbol corresponds to one resource configuration, and second UCI corresponding to the resource configuration is in a positive state.

C is not greater than a threshold, and the threshold is a value obtained by subtracting 1 from a maximum sequence cyclic shift value that can be supported by control information and reference signals.

(3) If the cyclic shift of the control information sequence or the reference signal sequence on the first time domain symbol is a cyclic shift obtained by adding m or m*C to an original cyclic shift for sending the control information sequence or the reference signal sequence on the first time domain symbol of the first PUCCH, it indicates that second PUCCHs corresponding to the first time domain symbol correspond to M resource configurations, and second UCI corresponding to an $m^{th}$ resource configuration in the M resource configurations is in a positive state. A state of second UCI corresponding to another resource configuration is unknown.

With reference to any one of the fourth aspect or the possible implementations of the fourth aspect, in a third possible implementation of the fourth aspect, when both N and M are integers greater than or equal to 2, the processing unit is specifically configured to: determine at least one of the M resource configurations that has a highest priority as the at least one resource configuration corresponding to the second UCI; or determine at least one of the M resource configurations that is indicated by the index information as the at least one resource configuration corresponding to the second UCI.

With reference to the first possible implementation of the fourth aspect, in a fourth possible implementation of the fourth aspect, when both N and M are integers greater than or equal to 2, priorities of the M resource configurations may be configured by a higher layer or predefined, or may be determined based on one or more of the following information: transmission periods corresponding to the M resource configurations, formats of the second PUCCHs corresponding to the M resource configurations, time domain resources occupied by the second PUCCHs corresponding to the M resource configurations, resource configuration indexes corresponding to the M resource configurations, indexes of logic channel groups corresponding to the M resource configurations, and priorities of the logic channel groups corresponding to the M resource configurations.

With reference to the first possible implementation of the fourth aspect, in a fifth possible implementation of the fourth aspect, when both N and M are integers greater than or equal to 2, the N second PUCCHs partially overlap or do not overlap in time domain.

With reference to the first possible implementation of the fourth aspect, in a sixth possible implementation of the fourth aspect, the time window is aligned with the time domain position of the first PUCCH; the time window is aligned with a time domain position of the time unit in which the first PUCCH is located; or the time window is aligned with a time domain position of an uplink transmission part in the time unit in which the first PUCCH is located.

According to a fifth aspect, an uplink control information transmission method is disclosed, and includes: determining, by a terminal device, a first uplink control channel PUCCH, where the first PUCCH is used to carry first uplink control information UCI, and the first UCI includes a hybrid automatic repeat request HARQ and/or channel state information CSI; determining, by the terminal device, a second PUCCH, where the second PUCCH is used to carry second UCI, a time domain position of the second PUCCH overlaps a time domain position of the first PUCCH, the second UCI includes a scheduling request SR, and the second UCI is in a positive state; and when the second UCI meets a condition, sending, by the terminal device, the second UCI on the second PUCCH, and sending the first UCI on a resource of the first PUCCH other than a resource of the first PUCCH that overlaps the second PUCCH in time domain; or only sending the second UCI on the second PUCCH when the second UCI meets a condition.

In some conditions, the SR may be separately sent. In this way, it is ensured that an uplink data transmission service of the terminal device is not affected.

With reference to the fifth aspect, in a first possible implementation of the fifth aspect, the condition includes: A priority of the second UCI is greater than or equal to a first threshold. The priority of the second UCI is a priority of a resource configuration corresponding to the second UCI. The priority of the resource configuration is configured by a higher layer or predefined; or the priority of the resource configuration is determined based on one or more of the following information: a transmission period of the resource configuration, a format of a second PUCCH corresponding to the resource configuration, a time domain resource occupied by the second PUCCH corresponding to the resource configuration, a resource configuration index corresponding to the resource configuration, an index of a logic channel group corresponding to the resource configuration, and a priority of the logic channel group corresponding to the resource configuration.

When the priority of the second UCI is relatively high, the second UCI and the HARQ/CSI may not be jointly coded and transmitted, but the second UCI is separately transmitted, to ensure that the uplink data service of the terminal device is not affected.

With reference to the fifth aspect, in the first possible implementation of the fifth aspect, the condition includes: A period of the second UCI is less than or equal to a second threshold.

When the period of the second UCI is a transmission period of a second PUCCH corresponding to the second UCI, and the period of the second UCI is less than or equal to the second threshold, it indicates that an uplink data service corresponding to the second UCI is relatively urgent and has a relatively high priority, and the second UCI may be separately transmitted, to respond to a request of the terminal device as soon as possible, and reduce a latency of the uplink data service of the terminal device.

With reference to the fifth aspect, in the first possible implementation of the fifth aspect, the condition includes: An end moment of the PUCCH corresponding to the second UCI is earlier than an end moment of the first PUCCH, and an absolute value of a difference between the end moment of the second PUCCH and the end moment of the first PUCCH is greater than or equal to a third threshold.

If the first UCI and the second UCI are jointly coded and transmitted, only after receiving of the first PUCCH is completed, an access network device can obtain the second UCI, and can allocate an uplink transmission resource to the terminal device based on the SR in the second UCI. However, if the second UCI is separately sent, the access network device may obtain the second UCI earlier. Because the difference between the end moment of the second PUCCH and the end moment of the first PUCCH is excessively large, if the first UCI and the second UCI are jointly coded and sent, the latency of the uplink data service is greatly increased. Therefore, the second UCI may be separately sent via the second PUCCH.

With reference to the fifth aspect, in the first possible implementation of the fifth aspect, the condition includes: A start moment of the second PUCCH corresponding to the second UCI is later than a start moment of the first PUCCH, and an absolute value of a difference between the start moment of the second PUCCH and the start moment of the first PUCCH is greater than or equal to a fourth threshold.

If the difference between the start moment of the second PUCCH and the start moment of the first PUCCH is excessively large, when the first UCI is sent, the first UCI and the second UCI may not be jointly coded in time. Therefore, the second UCI may be separately sent via the second PUCCH.

With reference to the fifth aspect, in a possible implementation of the fifth aspect, the condition includes: The second UCI is carried on at least two second PUCCHs.

If the second UCI is carried on the at least two second PUCCHs, it indicates that at the time domain position corresponding to the first PUCCH, there are at least two PUCCHs carrying the second UCI. This further indicates that the uplink data service corresponding to the second UCI is relatively urgent and has a relatively high priority. Therefore, the second UCI may be separately sent via the second PUCCH, to ensure that the uplink data service of the terminal device is not affected.

The first threshold to the fourth threshold may be configured by a higher layer, predefined, or dynamically indicated.

According to a sixth aspect, a terminal device is disclosed, and includes: a processing unit, configured to determine a first uplink control channel PUCCH, where the first PUCCH is used to carry first uplink control information UCI, and the first UCI includes a hybrid automatic repeat request HARQ and/or channel state information CSI; and further configured to determine a second PUCCH, where the second PUCCH is used to carry second UCI, a time domain position of the second PUCCH overlaps a time domain position of the first PUCCH, the second UCI includes a scheduling request SR, and the second UCI is in a positive state; and a sending unit, configured to: when the second UCI meets a condition, send the second UCI on the second PUCCH, and send the first UCI on a resource of the first PUCCH other than a resource of the first PUCCH that overlaps the second PUCCH in time domain; or only send the second UCI on the second PUCCH when the second UCI meets a condition.

In some conditions, the SR may be separately sent. In this way, it is ensured that an uplink data transmission service of the terminal device is not affected.

With reference to the sixth aspect, in a first possible implementation of the sixth aspect, the condition includes: A priority of the second UCI is greater than or equal to a first threshold. The priority of the second UCI is a priority of a resource configuration corresponding to the second UCI. The priority of the resource configuration is configured by a higher layer or predefined; or the priority of the resource configuration is determined based on one or more of the following information: a transmission period of the resource configuration, a format of a second PUCCH corresponding to the resource configuration, a time domain resource occupied by the second PUCCH corresponding to the resource configuration, a resource configuration index corresponding to the resource configuration, an index of a logic channel group corresponding to the resource configuration, and a priority of the logic channel group corresponding to the resource configuration.

When the priority of the second UCI is relatively high, the second UCI and HARQ/CSI may not be jointly coded and transmitted, but is separately transmitted, to ensure that the uplink data service of the terminal device is not affected.

With reference to the sixth aspect, in the first possible implementation of the sixth aspect, the condition includes: A period of the second UCI is less than or equal to a second threshold.

When the period of the second UCI is less than or equal to the second threshold, it indicates that an uplink data service corresponding to the second UCI is relatively urgent and has a relatively high priority, and the second UCI may be separately transmitted, to respond to a request of the terminal device as soon as possible, and reduce a latency of the uplink data service of the terminal device.

With reference to the sixth aspect, in the first possible implementation of the sixth aspect, the condition includes: An end moment of the PUCCH corresponding to the second UCI is earlier than an end moment of the first PUCCH, and an absolute value of a difference between the end moment of the second PUCCH and the end moment of the first PUCCH is greater than or equal to a third threshold.

If the first UCI and the second UCI are jointly coded and transmitted, only after receiving of the first PUCCH ends, an access network device can obtain the second UCI, and can allocate an uplink transmission resource to the terminal device based on the SR in the second UCI. However, if the second UCI is separately sent, the access network device may obtain the second UCI earlier. Because the difference between the end moment of the second PUCCH and the end moment of the first PUCCH is excessively large, if the first UCI and the second UCI are jointly coded and sent, the latency of the uplink data service is greatly increased. Therefore, the second UCI may be separately sent via the second PUCCH.

With reference to the sixth aspect, in the first possible implementation of the sixth aspect, the condition includes: A start moment of the second PUCCH corresponding to the second UCI is later than a start moment of the first PUCCH, and an absolute value of a difference between the start moment of the second PUCCH and the start moment of the first PUCCH is greater than or equal to a fourth threshold.

If the difference between the start moment of the second PUCCH and the start moment of the first PUCCH is excessively large, when the first UCI is sent, the first UCI and the second UCI may not be jointly coded in time. Therefore, the second UCI may be separately sent via the second PUCCH.

With reference to the sixth aspect, in the first possible implementation of the sixth aspect, the condition includes: The second UCI is carried on at least two second PUCCHs.

If the second UCI is carried on the at least two second PUCCHs, it indicates that at the time domain position corresponding to the first PUCCH, there are at least two PUCCHs carrying the second UCI. This further indicates that the uplink data service corresponding to the second UCI is relatively urgent and has a relatively high priority. Therefore, the second UCI may be separately sent via the second PUCCH, to ensure that the uplink data service of the terminal device is not affected.

According to a seventh aspect, a computer-readable storage medium is disclosed. The computer-readable storage medium stores a computer instruction. When the computer instruction is run on a computer, the computer is enabled to perform the method according to any implementation of the first aspect, any implementation of the second aspect, and any implementation of the fifth aspect.

According to an eighth aspect, a wireless communications apparatus is disclosed. The wireless communications apparatus stores a computer instruction. When the computer instruction is run, the wireless communications apparatus is enabled to perform the method according to any implementation of the first aspect, any implementation of the second aspect, and any implementation of the fifth aspect. The wireless communications apparatus may be a chip.

DETAILED DESCRIPTION OF ILLUSTRATIVE EMBODIMENTS

Figure 1:
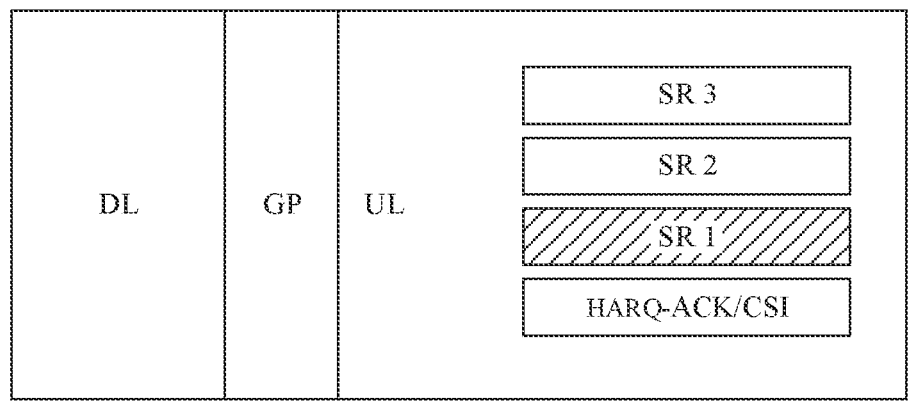
FIG. 1 is a schematic diagram of joint coding performed when resources of SRs are aligned with a resource of a HARQ/CSI in time domain.
Figure 2:
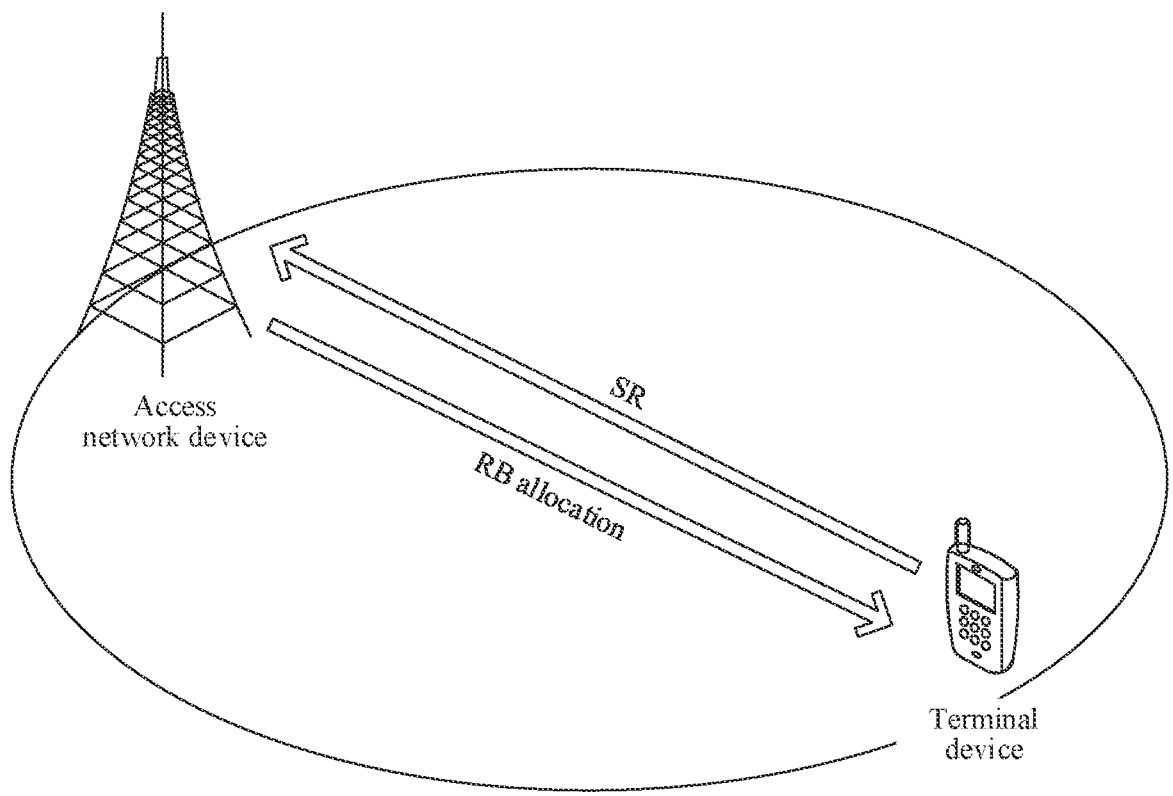
FIG. 2 is a schematic diagram of requesting an uplink transmission resource by a terminal device.

Referring to FIG. 2, a terminal device may usually apply to an access network device for a transmission resource by using an SR, to transmit new data. For retransmission, an SR is not required for resource application. Further, the terminal device may transmit the SR to the access network device by using a PUCCH. After successfully decoding an SR sent by a terminal device, the access network device allocates a physical resource block (RB) to the terminal device based on the SR, and the terminal device may transmit uplink data by using the RB allocated by the access network device.

A 5G communications system is dedicated to supporting higher system performance, for example, supporting an ultra-reliable low-latency communication (URLLC) service. In the 5G communications system, to reduce a latency of uplink data transmission, two solutions are provided: One is supporting grant-free (grant free, GF) transmission, to be specific, a scheduling request process is skipped to reduce a waiting latency of a data packet; the other one is supporting a plurality of scheduling request configurations, that is, the multiple SR configurations. Specifically, different logical channels may be associated with SRs having different configurations, and further, the different logical channels are allocated to different data services. The access network device may determine, based on a configuration of the SR sent by the terminal device, a logical channel corresponding to a to-be-sent uplink data service, further determine a reliability requirement, a latency requirement, and the like of a to-be-sent uplink data service of the terminal device, and may allocate a transmission resource to the terminal device based on the requirements of the terminal device.

In the prior art, when a plurality of SRs having different configurations and a HARQ/CSI are simultaneously transmitted, and time domain positions of PUCCHs carrying the SRs are aligned with a time domain position of a PUCCH carrying the HARQ/CSI (that is, both start positions of the time domain positions and lengths of the time domain positions are aligned with each other), if the SRs and the HARQ/CSI are to be jointly coded and transmitted, only one of the plurality of SRs that has a highest priority is transmitted, where the SRs have the different configurations. A solution to how to jointly code and transmit SRs and a HARQ/CSI in a scenario in which time domain positions of PUCCHs of the SRs are not aligned with a time domain position of a PUCCH of the HARQ/CSI, particularly when the PUCCHs of the plurality of SRs are time-division multiplexed with each other and do not overlap each other, but overlap the PUCCH of the HARQ/CSI in domain is not provided.

The embodiments of the present application provide an uplink control information transmission method. If a transmission conflict occurs between a plurality of SRs (which may be included in second UCI described in the embodiments of the present application) having different resource configurations and a HARQ/CSI (which may be included in first UCI described in the embodiments of the present application), a terminal device may first determine a time window based on a first PUCCH carrying the HARQ/CSI, and further determine N of second PUCCHs used to carry the plurality of SRs having the different resource configurations, where the N second PUCCHs overlap the time window, and determine M different resource configurations corresponding to the N second PUCCHs. Finally, the HARQ/CSI and an SR corresponding to at least one of the M resource configurations may be jointly coded and transmitted. It can be learned that in the method provided in the embodiments of the present application, a time domain range in which an SR may be transmitted is defined based on the time window, so that in a scenario in which time domain positions of SRs are not aligned with a time domain position of a HARQ/CSI, some SRs may be selected based on the time window, to jointly code and transmit the SRs and the HARQ/CSI. Further, the present application also proposes that an SR corresponding to at least one resource configuration is selected based on a priority and/or an SR state.

It should be noted that, in the embodiments of the present application, a transmission conflict between different information may be considered as a conflict between resources carrying the different information and in time domain. For example, the transmission conflict between the SRs and the HARQ/CSI is a conflict between a resource carrying the HARQ/CSI and resources carrying the SRs (which may be included in the second UCI in the embodiments of the present application) and in time domain. Further, when the conflict occurs between the resources carrying the different information and in time domain, it may be considered that PUCCH resources carrying the different information completely overlap in time domain, or it may be considered that PUCCH resources carrying the different information partially overlap in time domain, or it may also be considered that a PUCCH resource carrying one piece of information includes, in time domain, a PUCCH resource carrying another piece of information. Alternatively, when PUCCH resources carrying the different information appear in one slot, it is considered that a conflict occurs between the resources carrying the information and in time domain.

Figure 3:
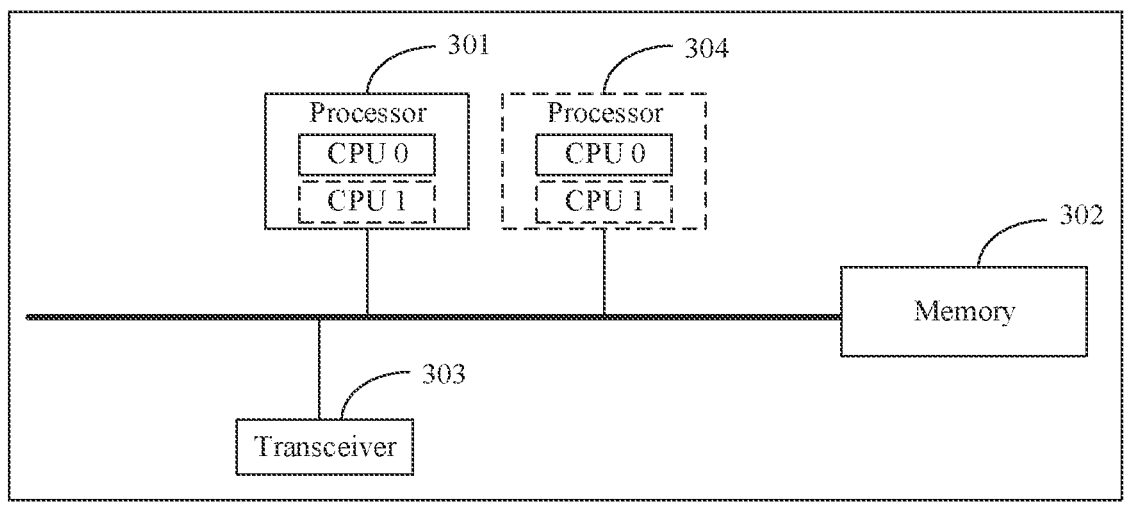
FIG. 3 is a structural block diagram of a terminal device according to an embodiment of the present application.

The uplink control information transmission method provided in the embodiments of this application may be applied to the terminal device. The terminal device may be user equipment. As shown in FIG. 3, the terminal device may include at least one processor 301, a memory 302, and a transceiver 303.

The following specifically describes the components of the terminal device with reference to FIG. 3.

The processor 301 is a control center of the terminal device, and may be a processor, or may be a collective term for a plurality of processing elements. For example, the processor 301 is a central processing unit (CPU), or may be an application-specific integrated circuit (ASIC), or may be configured as one or more integrated circuits implementing the embodiments of the present application, for example, one or more micro processors (DSP) or one or more field programmable gate arrays (FPGA).

The processor 301 may execute various functions of the terminal device by running or executing a software program stored in the memory 302 and invoking data stored in the memory 302.

During specific implementation, in an embodiment, the processor 301 may include one or more CPUs, for example, a CPU 0 and a CPU 1 shown in FIG. 3.

During specific implementation, in an embodiment, the terminal device may include a plurality of processors, for example, the processor 301 and a processor 304 that are shown in FIG. 3. Each of the processors may be a single-core processor (single-CPU) or may be a multi-core processor (multi-CPU). The processor herein may refer to one or more devices, circuits, and/or processing cores configured to process data (for example, a computer program instruction).

The memory 302 may be a read-only memory (ROM) or another type of static storage terminal device that can store static information and instructions, or a random access memory (RAM) or another type of dynamic storage terminal device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage terminal device, or any other medium that can be used to carry or store expected program code in a form of an instruction or a data structure and that can be accessed by a computer, but is not limited thereto. The memory 302 may exist independently, or may be connected to the processor 301. The memory 302 may alternatively be integrated with the processor 301.

The memory 302 is configured to store the software program for executing the solutions in the present application, and the execution is controlled by the processor 301.

The transceiver 303 is configured to communicate with another terminal device such as the access network device in FIG. 2 or another terminal device by using any apparatus such as a transceiver. The transceiver 303 may be further configured to communicate with a communications network such as the Ethernet, a radio access network (RAN), or a wireless local area network (WLAN). The transceiver 303 may include a receiving unit for implementing a receiving function and a sending unit for implementing a sending function.

A structure of the terminal device shown in FIG. 3 does not constitute a limitation on the terminal device. The terminal device may include components more or fewer than those shown in the figure, may combine some components, or may have different component arrangements.

Figure 4:
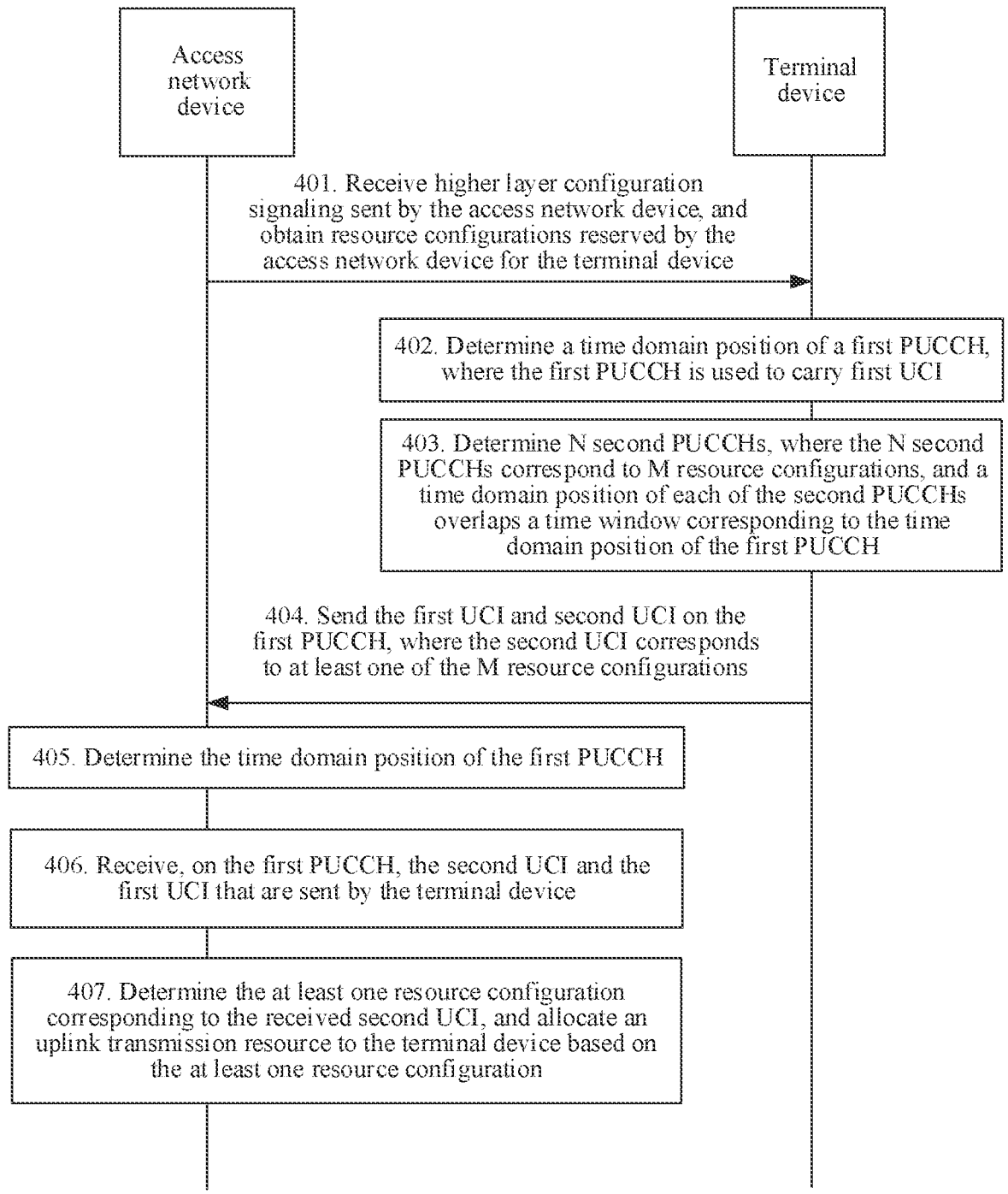
FIG. 4 is a schematic flowchart of an uplink control information transmission method according to an embodiment of the present application.

An embodiment of the present application provides an uplink control information transmission method. As shown in FIG. 4, the method includes the following steps.

401. A terminal device receives higher layer configuration signaling sent by an access network device, and obtains resource configurations reserved by the access network device for the terminal device.

It should be noted that the resource configuration is used to configure an SR. The higher layer configuration signaling includes a detailed configuration parameter of each resource configuration. The configuration parameter of the resource configuration includes: a transmission period of a PUCCH carrying an SR, an offset of the PUCCH carrying the SR in one period, transmission resource information of the PUCCH carrying the SR, and the like in the resource configuration. Specifically, the transmission resource information of the PUCCH includes a format of the PUCCH, a time domain position of the PUCCH, and a frequency domain resource of the PUCCH. The configuration parameter of the resource configuration may further include a priority index of the resource configuration, to indicate a number of the resource configuration in all SR resource configurations.

402. The terminal device determines a time domain position of a first PUCCH, where the first PUCCH is used to carry first UCI.

The first uplink control information (UCI) may include a HARQ and/or CSI.

If the terminal device feeds back the HARQ on the first PUCCH, a resource of the first PUCCH is indicated by using downlink (DL) assignment, and specifically, is indicated by using a PUCCH resource allocation field in the DL assignment. The resource of the first PUCCH includes the time domain position of the first PUCCH, to be specific, a start symbol and a symbol length.

If the first PUCCH is used to send periodic CSI (that is, P-CSI) or semi-persistent CSI (that is, SP-CSI), the resource of the first PUCCH is configured by using the higher layer signaling.

If the first PUCCH is used to send aperiodic CSI (that is, A-CSI), the resource of the first PUCCH is indicated by using the DL assignment and/or the higher layer signaling.

In some cases, the first PUCCH occupies one continuous time domain resource in one time unit in time domain. Alternatively, the first PUCCH corresponds to L continuous time domain resources in L time units in time domain. The L continuous time domain resources respectively belong to the L time units. The time unit may be a slot, or may be another time unit such as a subframe or a mini slot. The L continuous time domain resources in the L time units have a same start position and length.

403. The terminal device determines N second PUCCHs, where the N second PUCCHs correspond to M resource configurations, and a time domain position of each of the second PUCCHs overlaps a time window corresponding to the time domain position of the first PUCCH.

Currently, one or more logical channels may be associated with a same resource configuration. When the terminal device has uplink data to transmit, the terminal device first determines, at a medium access control (MAC) layer, a logical channel for transmitting the uplink data, then determines an SR resource configuration corresponding to the logical channel, and finally transmit, via a physical layer (PHY), an SR on a PUCCH resource corresponding to the SR resource configuration, to request an uplink transmission resource from the access network device.

When the terminal device sends the HARQ/CSI, if a transmission conflict occurs between SRs having a plurality of resource configurations and the HARQ/CSI, the terminal device may select one or more resource configurations from the plurality of resource configurations obtained in step 401, and jointly code and transmit an SR corresponding to the selected resource configuration and the HARQ/CSI. In this embodiment of the present application, the terminal device may use, as a measurement criterion, the time window corresponding to the time domain position of the first PUCCH carrying the HARQ/CSI, to select one or more resource configurations meeting a condition.

Figure 5A:
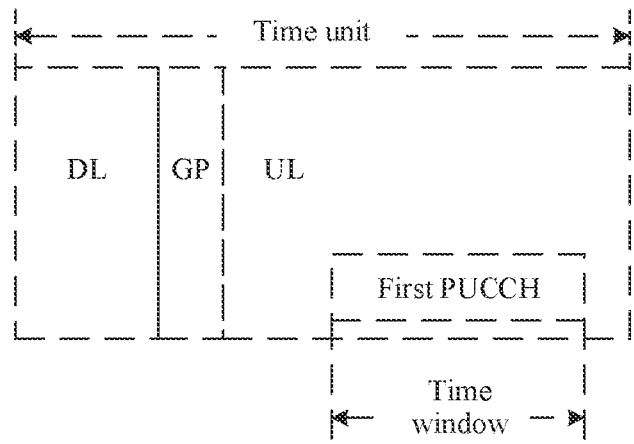
FIG. 5a is a schematic diagram of a time window according to an embodiment of the present application.

Referring to FIG. 5a, the time window corresponding to the time domain position of the first PUCCH may be aligned with the time domain position of the first PUCCH. Alternatively, referring to FIG. 5b, the time window may be aligned with a time domain position of the time unit in which the first PUCCH is located. Alternatively, referring to FIG. 5c, the time window may be aligned with a time domain position of an uplink transmission part in the time unit in which the first PUCCH is located. It should be noted that the time unit may be a slot or a mini slot.

During specific implementation, the terminal device first determines one or more PUCCHs specified in each of the resource configurations obtained in step 401, and further selects, from the PUCCHs, the N second PUCCHs overlapping the time window.

Figure 6:
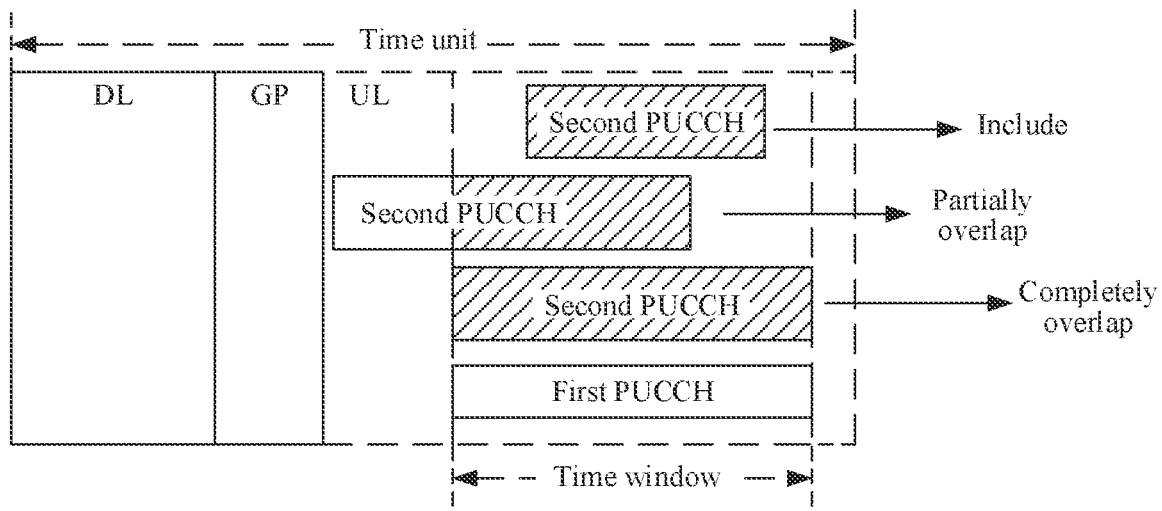
FIG. 6 is a schematic diagram of an overlapping relationship between PUCCHs and a time window according to an embodiment of the present application.

For example, referring to FIG. 6, the time domain positions of the second PUCCHs selected by the terminal device may completely overlap the time window, or may partially overlap the time window. Certainly, the time domain positions of the second PUCCHs selected by the terminal device may alternatively be included in the time window.

Further, the time domain positions of the second PUCCHs selected by the terminal device overlap the time window, and start moments of the second PUCCHs are not later than a start moment of the time window.

In this embodiment of the present application, the N second PUCCHs may completely or partially overlap in time domain. Certainly, the N second PUCCHs may not overlap in time domain. This is not limited in this embodiment of the present application.

It should be noted that a resource configuration specifies one or more PUCCHs used to carry an SR, and the PUCCHs correspond to the resource configuration. When the N second PUCCHs are determined based on the time window, the M resource configurations corresponding to the N second PUCCHs may be determined. For example, time domain positions of a PUCCH 1, a PUCCH 2, and a PUCCH 3 overlap the time window. The PUCCH 1 and the PUCCH 2 each are a PUCCH carrying an SR in a first resource configuration, and the PUCCH 3 is a PUCCH carrying an SR in a second resource configuration. Therefore, the PUCCH 1, the PUCCH 2, and the PUCCH 3 correspond to two resource configurations.

In some embodiments of the present application, both M and N are integers greater than or equal to 2. In such embodiments, values of M and N are not specially described. If one piece of second UCI is carried on only one second PUCCH, and types of resource configurations of second UCI carried on the N second PUCCHs are different, the N second PUCCHs correspond to N resource configurations. In this case, N is equal to M. Certainly, if second UCI carried on different second PUCCHs corresponds to a same resource configuration, N is greater than M. Alternatively, if one piece of second UCI may be carried on a plurality of second PUCCHs, N may be greater than M. In conclusion, N is greater than or equal to M.

In some embodiments of the present application, both M and N are integers greater than or equal to 1. This includes a case in which both M and N are integers greater than or equal to 2 and a case in which M is equal to 1 or both M and N are equal to 1. In such embodiments, values of M and N are specially described.

404. The terminal device sends the first UCI and second UCI on the first PUCCH, where the second UCI corresponds to at least one of the M resource configurations.

The second UCI includes an SR, and the terminal device may request the uplink transmission resource from the access network device by using the SR in the second UCI.

During specific implementation, the at least one resource configuration is at least one of the M resource configurations that has a highest priority; or the at least one resource configuration is at least one of resource configurations that has a highest priority, where the resource configurations correspond to second UCI that is in a positive state and that is corresponding to the M resource configurations.

In addition, a priority of a resource configuration may be configured by a higher layer or predefined. Certainly, priorities of the M resource configurations may also be determined based on one or more of the following information: transmission periods corresponding to the M resource configurations, formats of the second PUCCHs corresponding to the M resource configurations, time domain resources occupied by the second PUCCHs corresponding to the M resource configurations, resource configuration indexes corresponding to the M resource configurations, indexes of logic channel groups corresponding to the M resource configurations, and priorities of the logic channel groups corresponding to the M resource configurations.

The transmission period corresponding to the resource configuration is a transmission period of a second PUCCH carrying an SR in the resource configuration. Moreover, the shorter a transmission period of a second PUCCH, the higher a priority of a resource configuration corresponding to the second PUCCH is. For example, a resource configuration 1 specifies that a PUCCH carrying an SR is sent at an interval of five orthogonal frequency division multiplexing (OFDM) symbols, and a resource configuration 2 specifies that a PUCCH carrying an SR is sent at an interval of seven OFDM symbols. It can be learned that a PUCCH transmission period specified in the resource configuration 1 is shorter, and a priority of the resource configuration 1 is higher than that of the resource configuration 2.

The format of the second PUCCH corresponding to the resource configuration is a format of a second PUCCH carrying an SR in the resource configuration. Specifically, a format of a PUCCH may be a format 0, a format 1, a format 2, a format 3, or a format 4. The format 0 and the format 1 are used to carry UCI of one or two bits, and the format 2, the format 3, and the format 4 are used to carry UCI of more than two bits. If an SR has only one bit, a format of a second PUCCH carrying the SR can only be the format 0 or the format 1. The format 0 corresponds to a short PUCCH, and a time domain length is 1 or 2 symbols; the format 1 corresponds to a long PUCCH, and a time domain length is 4 to 14 symbols. A priority of a resource configuration corresponding to the short PUCCH is higher than that of a resource configuration corresponding to the long PUCCH. Therefore, the priorities of the M resource configurations may be determined based on the formats of the second PUCCHs corresponding to the M resource configurations.

In some embodiments, a corresponding resource configuration index may be preset for each resource configuration, and different resource configuration indexes correspond to different priorities. Therefore, the priorities of the M resource configurations may be determined based on the resource configuration indexes corresponding to the M resource configurations. For example, the access network device configures five resource configurations numbered 0 to 4 for the terminal device, and priorities of the five resource configurations meet: a priority of a resource configuration indexed 0>a priority of a resource configuration indexed 1>a priority of a resource configuration indexed 2>a priority of a resource configuration indexed 3>a priority of a resource configuration indexed 4. Certainly, a correspondence between resource configuration indexes and priorities is not limited thereto. It may also be considered that a larger resource configuration index indicates a higher priority of a resource configuration, for example, the priority of the resource configuration indexed 0<the priority of the resource configuration indexed 1<the priority of the resource configuration indexed 2<the priority of the resource configuration indexed 3<the priority of the resource configuration indexed 4. The correspondence between the resource configuration indexes and the priorities of the resource configurations is not limited in this embodiment of the present application. The foregoing two manners are merely examples, and there may alternatively be another correspondence between the resource configuration indexes and the priorities of the resource configurations. Assuming that the M resource configurations are the resource configuration indexed 0, the resource configuration indexed 2, and the resource configuration indexed 4, the priorities of the M resource configurations may be determined based on the indexes of the resource configurations.

The earlier a time domain resource occupied by a second PUCCH corresponding to a resource configuration, the higher a priority of the resource configuration is. Therefore, the priorities of the M resource configurations may be determined based on the time domain resources occupied by the N second PUCCHs. In addition, if a resource configuration defines a plurality of PUCCHs, one of the PUCCHs that is at an earliest time domain position is used to represent the resource configuration and is compared with a PUCCH corresponding to another resource configuration, and the earlier a time domain resource occupied by a PUCCH, the higher a priority of a resource configuration is.

In some embodiments, the priority of the resource configuration may be alternatively determined based on a length of the time domain resource of the second PUCCH corresponding to the resource configuration. Specifically, the shorter a time domain resource occupied by a second PUCCH corresponding to a resource configuration, the higher a priority of the resource configuration is. The length of the time domain resource of the second PUCCH is a time domain length of the second PUCCH. As described above, the second PUCCH carrying the SR may be in the format 0 or the format 1. The format 0 corresponds to a short PUCCH, and the time domain length is 1 or 2 symbols; the format 1 corresponds to a long PUCCH, and the time domain length is 4 to 14 symbols. Therefore, a time domain length of the second PUCCH carrying the SR may be 1 symbol, 2 symbols, or 4 to 14 symbols. The shorter a time domain resource occupied by a PUCCH, the lower a priority of the resource configuration corresponding to the PUCCH is. On the contrary, the longer a time domain resource occupied by a second PUCCH corresponding to a resource configuration, the lower a priority of the resource configuration is.

The index of the logic channel group corresponding to the resource configuration is an index of a logic channel group bound to the resource configuration. It should be noted that the logic channel group includes a plurality of logical channels. Different indexes of logic channel groups correspond to different priorities. Therefore, the priorities of the M resource configurations may be determined based on the indexes of the logic channel groups corresponding to the M resource configurations. For example, a priority of a logic channel group 1 is higher than that of a logic channel group 2, the priority of the logic channel group 2 is higher than that of a logic channel group 3, and so on.

In some embodiments, a priority of a logic channel group corresponding to a resource configuration may be further regarded as a priority of the resource configuration. If a resource configuration corresponds to a plurality of logic channel groups, a priority of a logic channel group having a highest priority may be regarded as a priority of the resource configuration, or a priority of a logic channel group with a lowest priority may be regarded as a priority of the resource configuration. This is not limited in this embodiment of the present application. Further, a priority of a logic channel group may be a priority of a logical channel having a lowest priority in the logic channel group, may be a priority of a logical channel having a highest priority in the logic channel group, or certainly, may be a priority of another logical channel in the logic channel group. This is not limited in this embodiment of the present application.

Further, if one of the foregoing information is a measurement criterion, and the M resource configurations include resource configurations having a same priority, priorities of the resource configurations having the same priority are determined based on another one of the foregoing information. For example, priorities of three resource configurations are first determined based on transmission periods corresponding to the resource configurations as the measurement criterion. In a first resource configuration, a PUCCH carrying an SR is sent at an interval of five OFDM symbols. In a second resource configuration, a PUCCH carrying an SR is sent at an interval of seven OFDM symbols. In a third resource configuration, a PUCCH carrying an SR is sent at an interval of seven OFDM symbols. According to a rule in which a shorter transmission period indicates a higher priority, the priorities of the three resource configurations specifically meet: the priority of the first resource configuration>(the priority of the second resource configuration=the priority of the third resource configuration). Further, the priorities of the second resource configuration and the third resource configuration may be determined based on PUCCH formats. If a format of the PUCCH corresponding to the second resource configuration is the format 0, and a format of the PUCCH corresponding to the third resource configuration is the format 1, the priority of the second resource configuration is higher than the priority of the third resource configuration.

In some embodiments, the second UCI corresponding to the at least one resource configuration may be considered as second UCI configured based on the at least one resource configuration. For example, an SR configured based on a first resource configuration may be referred to as an SR 1, and an SR configured based on a second resource configuration may be referred to as an SR 2. In an implementation, the at least one resource configuration is one resource configuration. To be specific, the terminal device selects one resource configuration from the M resource configurations, and jointly codes and transmits the first UCI and the second UCI corresponding to the resource configuration on the first PUCCH.

During specific implementation, the terminal device may jointly code the first UCI and state information and/or index information of the second UCI corresponding to the at least one resource configuration, and send coded information on the first PUCCH.

The state information is used to indicate whether the second UCI is in a positive state or a negative state, or may be used to indicate whether the SR included in the second UCI is in a positive state or a negative state. The index information is used to indicate an index of the resource configuration corresponding to the second UCI in the plurality of resource configurations reserved by the access network device for the terminal device, or is used to indicate an index of the resource configuration corresponding to the second UCI in a plurality of resource configurations supported by the terminal device, or is used to indicate an index of the resource configuration corresponding to the second UCI in the M resource configurations.

In some embodiments, both M and N are integers greater than or equal to 1, the first PUCCH corresponds to L continuous time domain resources in L time units in time domain. The L continuous time domain resources respectively belong to the L time units. The time unit may be a slot, or may be another time unit such as a subframe or a mini slot. The L continuous time domain resources in the L time units have a same start position and length. Further, separately sending the first UCI on the L continuous time domain resources in the L time units occupied by the first PUCCH includes: separately coding and transmitting the first UCI on the L continuous time domain resources in the L time units, where the L continuous time domain resources in the L time units each carry a redundancy version obtained after the first UCI is coded, and the redundancy versions may be different or the same; or separately representing the first UCI by using different sequences on the L continuous time domain resources.

In this case, that the terminal device separately sends, on the first PUCCH, the first UCI and the second UCI that corresponds to the at least one resource configuration, where time domain resources on which the first PUCCH is located include the L continuous time domain resources in the L time units, specifically includes: jointly coding the first UCI and state information and/or index information of the second UCI corresponding to the at least one resource configuration, and sending coded information on the L continuous time domain resources that are in the L time units and that are occupied by the first PUCCH. The at least one resource configuration may be one resource configuration. Descriptions of the state information and the index information are the same as those described above.

Specifically, the first UCI and the state information and/or the index information of the second UCI corresponding to the at least one resource configuration may be jointly coded and sent in the following several implementations:

First, the state information of the second UCI corresponding to the at least one resource configuration is added after or before a position of the first UCI, to obtain to-be-sent information bits, and the to-be-sent information bits are coded.

In this implementation, by default, the terminal device always selects an SR corresponding to a resource configuration having a highest priority, to jointly code and transmit the SR and the HARQ/CSI. For example, the at least one resource configuration is X resource configurations that are in the M resource configurations and that have top-ranked priorities. The access network device and the terminal device can reach a consensus on "priorities of the plurality of resource configurations reserved by the access network device for the terminal device". Therefore, the access network device may determine the X resource configurations that are in the M resource configurations and that have top-ranked priorities, and the terminal device needs to indicate, to the access network device, activation statuses of second UCI corresponding only to the X resource configurations. Further, if second UCI corresponding to a resource configuration is in a positive state on a second PUCCH and is in a negative state on another second PUCCH, state information indicated by the terminal device is the positive state.

Second, the index information of the second UCI corresponding to the at least one resource configuration is added after or before the first UCI, to obtain to-be-sent information bits, and the to-be-sent information bits are coded.

In this implementation, the terminal device selects at least one of resource configurations that has a highest priority, where the resource configurations correspond to second UCI that is in a positive state and that is in second UCI corresponding to the M resource configurations. The access network device can only determine that the second UCI sent by the terminal device is in a positive state, but cannot determine an index of the resource configuration corresponding to the second UCI sent by the terminal device. Therefore, the index information of the second UCI corresponding to the at least one resource configuration is added after or before a position of the first UCI, to indicate, to the access network device, index information of the resource configuration corresponding to the second UCI sent by the terminal device, so that the access network device can learn of an actual resource configuration requirement of the terminal device based on the index information, and allocate an appropriate uplink transmission resource to the terminal device.

Third, the state information and the index information of the second UCI corresponding to the at least one resource configuration are added after or before the first UCI, to obtain to-be-sent information bits, and the to-be-sent information bits are coded.

In this implementation, the terminal device may indicate both the state information and the index information of the second UCI to the access network device, so that the access network device can determine, based on the index information indicated by the terminal device, the resource configuration selected by the terminal device and whether second UCI corresponding to the resource configuration selected by the terminal device is activated.

Fourth, the terminal device sends the first UCI on the first PUCCH, where a reference signal sequence on the first PUCCH is used to indicate the index information of the second UCI corresponding to the at least one resource configuration, or a cyclic shift of a reference signal on the first PUCCH is used to indicate the index information of the second UCI corresponding to the at least one resource configuration.

In this implementation, the second UCI corresponding to the at least one resource configuration selected by the terminal device is in a positive state by default. Further, the terminal device may indicate, in an implicit manner, the index information of the second UCI corresponding to the at least one resource configuration, that is, index information of the at least one resource configuration.

Specifically, the reference signal sequence on the first PUCCH is a sequence in a sequence set. The sequence set includes Q sequences. The first sequence in the sequence set is used to indicate that the second UCI corresponding to the at least one resource configuration is in a negative state. The $q^{th}$ sequence in the sequence set is used to indicate that the second UCI corresponding to the at least one resource configuration is in a positive state, and an index of to-be-sent uplink control information is q−1. Q is an integer greater than or equal to 1, and q is an integer greater than or equal to 2 and less than or equal to Q.

Alternatively, the cyclic shift of the reference signal on the first PUCCH is a cyclic shift in a cyclic shift set. The cyclic shift set includes J cyclic shifts. The first cyclic shift in the cyclic shift set is used to indicate that the second UCI corresponding to the at least one resource configuration is in a negative state. The $j^{th}$ cyclic shift in the cyclic shift set is used to indicate that the second UCI corresponding to the at least one resource configuration is in a positive state, and an index of to-be-sent uplink control information is j−1. J is an integer greater than or equal to 1, and j is an integer greater than or equal to 2 and less than or equal to Q.

In the prior art, when a transmission conflict occurs between a plurality of SRs having different resource configurations and a HARQ/CSI, and the SRs are aligned with the HARQ/CSI in time domain, a terminal device transmits an SR corresponding to a resource configuration having a highest priority (regardless of whether the SR is in a positive state or a negative state). Although an access network device may know which SR is selected by the terminal device, a cost is that an SR actually in a positive state may not obtain a transmission opportunity, and a waiting time of a service corresponding to the SR in the positive state is greatly prolonged. If the terminal device preferentially selects the SR in the positive state, the access network device cannot determine which resource configuration is selected by the terminal device, and further cannot allocate an uplink transmission resource to the terminal device based on the resource configuration actually selected by the terminal device. In this embodiment of the present application, the index information of the resource configuration selected by the terminal device is indicated to the access network device in an explicit or implicit manner, so that the access network device can allocate the uplink transmission resource to the terminal device based on the resource configuration actually selected by the terminal device.

In some embodiments, both M and N are integers greater than or equal to 1. The first UCI carried on the first PUCCH is the HARQ and has a quite small quantity of information bits, for example, less than or equal to 2 bits. In this case, the terminal device maps the first UCI to different cyclic shifts of a sequence, sends, on the first PUCCH by using the different cyclic shifts, the sequence to represent the first UCI. Alternatively, the terminal device codes and modulates the first UCI, and multiplies a modulated symbol by a specified sequence, to jointly send the modulated symbol multiplied by the specified sequence and a reference signal sequence on the first PUCCH. In this case, that the terminal device sends, on the first PUCCH, the first UCI and the second UCI that corresponds to the at least one resource configuration includes: sending, by the terminal device, the first UCI on the first PUCCH, where the different cyclic shifts indicate the state information and/or the index information of the second UCI corresponding to the at least one resource configuration. A cyclic shift of a control information sequence and/or a reference signal sequence on a first time domain symbol occupied by the first PUCCH is used to indicate the state information and/or the index information of the second UCI corresponding to the at least one resource configuration.

It should be noted that the first time domain symbol is a time domain symbol that is in the continuous time domain resource and on which the first PUCCH overlaps the second PUCCH in time domain. That is, the terminal device sends the control information sequence or the reference signal sequence on a time domain symbol other than the first time domain symbol on the first PUCCH in an original manner, and adjusts the cyclic shift of the control information sequence and/or the reference signal sequence on the first time domain symbol. This specifically includes:

(1) When a quantity of resource configurations corresponding to all second PUCCHs corresponding to the first time domain symbol is 1, and state information of second UCI corresponding to the resource configuration is a negative state, the cyclic shift of the control information sequence or the reference signal sequence on the first time domain symbol remains unchanged, and is an original cyclic shift for sending the control information sequence or the reference signal sequence on the first time domain symbol of the first PUCCH; when the state information of the second UCI corresponding to the resource configuration is a positive state, 1 or C is added to the cyclic shift of the control information sequence or the reference signal sequence on the first time domain symbol, where C is not greater than a threshold. The threshold is a value obtained by subtracting 1 from a maximum sequence cyclic shift value that can be supported by control information and reference signals.

(2) When a quantity of resource configurations corresponding to all second PUCCHs corresponding to the first time domain symbol is M, and all state information of second UCI corresponding to the M resource configurations is a negative state, the cyclic shift of the control information sequence or the reference signal sequence on the first time domain symbol remains unchanged, and is an original cyclic shift for sending the control information sequence or the reference signal sequence on the first time domain symbol of the first PUCCH; when state information of second UCI corresponding to an $m^{th}$ resource configuration is a positive state, m or m*C is added to the cyclic shift of the control information sequence or the reference signal sequence on the first time domain symbol, where m or m*C is not greater than the threshold. Herein, when m or m*C is added to the cyclic shift of the control information sequence or the reference signal sequence on the first time domain symbol, it indicates that the second UCI corresponding to the $m^{th}$ resource configuration is in a positive state, and a state of second UCI corresponding to another resource configuration is unknown, and may be a negative state by default.

405. The access network device determines the time domain position of the first PUCCH.

Because the resource of the first PUCCH is indicated by the access network device to the terminal device by using the DL assignment, the access network device can determine the time domain position of the first PUCCH.

406. The access network device receives, on the first PUCCH, the second UCI and the first UCI that are sent by the terminal device.

Specifically, corresponding to the several joint coding schemes described in step 404, the access network device may also receive, in the following several manners, the second UCI and the first UCI that are sent by the terminal device:

(1) receiving the first UCI and the state information of the second UCI on the first PUCCH;

(2) receiving, on the first PUCCH, the first UCI and the state information and the index information of the second UCI;

(3) receiving the first UCI on the first PUCCH, and determining the index information of the second UCI based on the reference signal sequence on the first PUCCH or the cyclic shift of the reference signal on the first PUCCH, where details of how to determine the index information based on the reference signal sequence or the cyclic shift of the reference signal are described in detail in step 404, and are not described herein again; and (4) when both M and N are integers greater than or equal to 1, receiving the first UCI on the first PUCCH, and determining the state information and/or the index information of the second UCI based on the cyclic shift of the control information sequence and/or the reference signal sequence on the first time domain symbol occupied by the first PUCCH, where the first time domain symbol is the time domain symbol that is in the continuous time domain resource and on which the first PUCCH overlaps the second PUCCH in time domain.

During specific implementation, the terminal device sends the control information sequence or the reference signal sequence on the time domain symbol other than the first time domain symbol on the first PUCCH in the original manner, adjusts the cyclic shift of the control information sequence and/or the reference signal sequence on the first time domain symbol, and uses a different cyclic shift to indicate the state information and/or the index information of the second UCI corresponding to the at least one resource configuration. In this way, after receiving the first UCI on the first PUCCH, a network device may further determine the state information and/or the index information of the second UCI based on the cyclic shift of the control information sequence and/or the reference signal sequence on the first time domain symbol occupied by the first PUCCH.

In addition, the cyclic shift of the control information sequence and/or the reference signal sequence on the first time domain symbol indicates, in the following implementations (a), (b), and (c), the state information and/or the index information of the second UCI corresponding to the at least one resource configuration:

(a) If the cyclic shift of the control information sequence or the reference signal sequence on the first time domain symbol is the original cyclic shift for sending the control information sequence or the reference signal sequence on the first time domain symbol of the first PUCCH, it indicates that the second PUCCH corresponding to the first time domain symbol corresponds to one resource configuration, and second UCI corresponding to the resource configuration is in a negative state. Alternatively, it indicates that second PUCCHs corresponding to the first time domain symbol correspond to M resource configurations, and second UCI corresponding to the M resource configurations is in a negative state. M is an integer greater than 1.

(b) If the cyclic shift of the control information sequence or the reference signal sequence on the first time domain symbol is a cyclic shift obtained by adding 1 or C to the original cyclic shift for sending the control information sequence or the reference signal sequence on the first time domain symbol of the first PUCCH, it indicates that the second PUCCH corresponding to the first time domain symbol corresponds to one resource configuration, and second UCI corresponding to the resource configuration is in a positive state.

C is not greater than the threshold, and the threshold is the value obtained by subtracting 1 from the maximum sequence cyclic shift value that can be supported by control information and reference signals.

(c) If the cyclic shift of the control information sequence or the reference signal sequence on the first time domain symbol is a cyclic shift obtained by adding m or m*C to the original cyclic shift for sending the control information sequence or the reference signal sequence on the first time domain symbol of the first PUCCH, it indicates that second PUCCHs corresponding to the first time domain symbol corresponds to M resource configurations, and second UCI corresponding to an $m^{th}$ resource configuration in the M resource configurations is in a positive state. A state of second UCI corresponding to another resource configuration is unknown.

407. The access network device determines the at least one resource configuration corresponding to the received second UCI, and allocates the uplink transmission resource to the terminal device based on the at least one resource configuration.

Figure 5B:
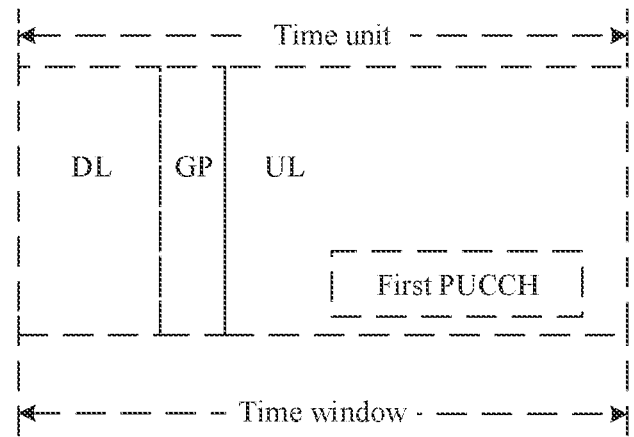
FIG. 5b is another schematic diagram of a time window according to an embodiment of the present application.
Figure 5C:
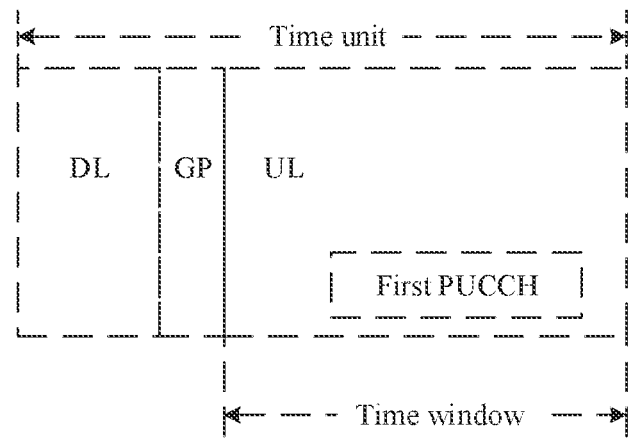
FIG. 5c is another schematic diagram of a time window according to an embodiment of the present application.

During specific implementation, the access network device first determines the time window corresponding to the first PUCCH. Specifically, the time window is predefined. For the access network device and the terminal device, time windows corresponding to the first PUCCH are the same. The time window is shown in FIG. 5a. To be specific, the time window corresponding to the time domain position of the first PUCCH may be aligned with the time domain position of the first PUCCH. Alternatively, as shown in FIG. 5b, the time window may be aligned with the time domain position of the time unit in which the first PUCCH is located. Alternatively, as shown in FIG. 5c, the time window may be aligned with the time domain position of the uplink transmission part (that is, a UL part of the time unit in which the first PUCCH is located) in the time unit in which the first PUCCH is located.

The access network device may determine, by using the following steps, the at least one resource configuration corresponding to the received second UCI:

(1) First, determine the PUCCH specified in each of the plurality of resource configurations that are reserved for the terminal device and that are in step 401, and further select, from the PUCCHs, the N second PUCCHs overlapping the time window.

For example, referring to FIG. 6, the time domain positions of the second PUCCHs selected by the terminal device may completely overlap the time window, or may partially overlap the time window. Certainly, the time domain positions of the second PUCCHs selected by the terminal device may alternatively be included in the time window.

In this embodiment of the present application, the N second PUCCHs may completely or partially overlap in time domain. Certainly, the N second PUCCHs may not overlap in time domain. This is not limited in this embodiment of the present application.

(2) Determine the M resource configurations corresponding to the N second PUCCHs.

Usually, a resource configuration specifies PUCCHs each used to carry an SR, and the PUCCHs correspond to the resource configuration. When the N second PUCCHs are determined based on the time window, the M resource configurations corresponding to the N second PUCCHs may be determined.

(3) Determine at least one of the M resource configurations that corresponds to the second UCI received by the access network device.

During specific implementation, the at least one resource configuration is at least one of the M resource configurations that has a highest priority, or at least one of the M resource configurations that is indicated by the index information obtained by the access network device is determined as the at least one resource configuration corresponding to the second UCI.

The index information obtained by the access network device may be received and directly sent by the terminal device occupied by the first PUCCH, or may be implicitly indicated by the terminal device by using the reference signal sequence or the cyclic shift of the reference signal on the first PUCCH.

In some embodiments, both M and N are integers greater than or equal to 1. The access network device determines a time domain position of a corresponding second PUCCH and the index information of the at least one resource configuration by determining a cyclic shift of a control information sequence or a reference signal sequence on each symbol on the first PUCCH.

In this embodiment of the present application, when PUCCH resources of a plurality of SRs having different configurations are not aligned with a PUCCH resource of the HARQ/CSI in time domain, the time window corresponding to the time domain position of the first PUCCH carrying the HARQ/CSI may be used as a reference criterion, to select an SR, where the SR and the HARQ/CSI are jointly coded and transmitted. This resolves a problem that the SRs and the HARQ/CSI cannot be jointly coded and transmitted in a scenario in which the PUCCH resources of the SRs are not aligned with the PUCCH resource of the HARQ/CSI in time domain.

Figure 7:
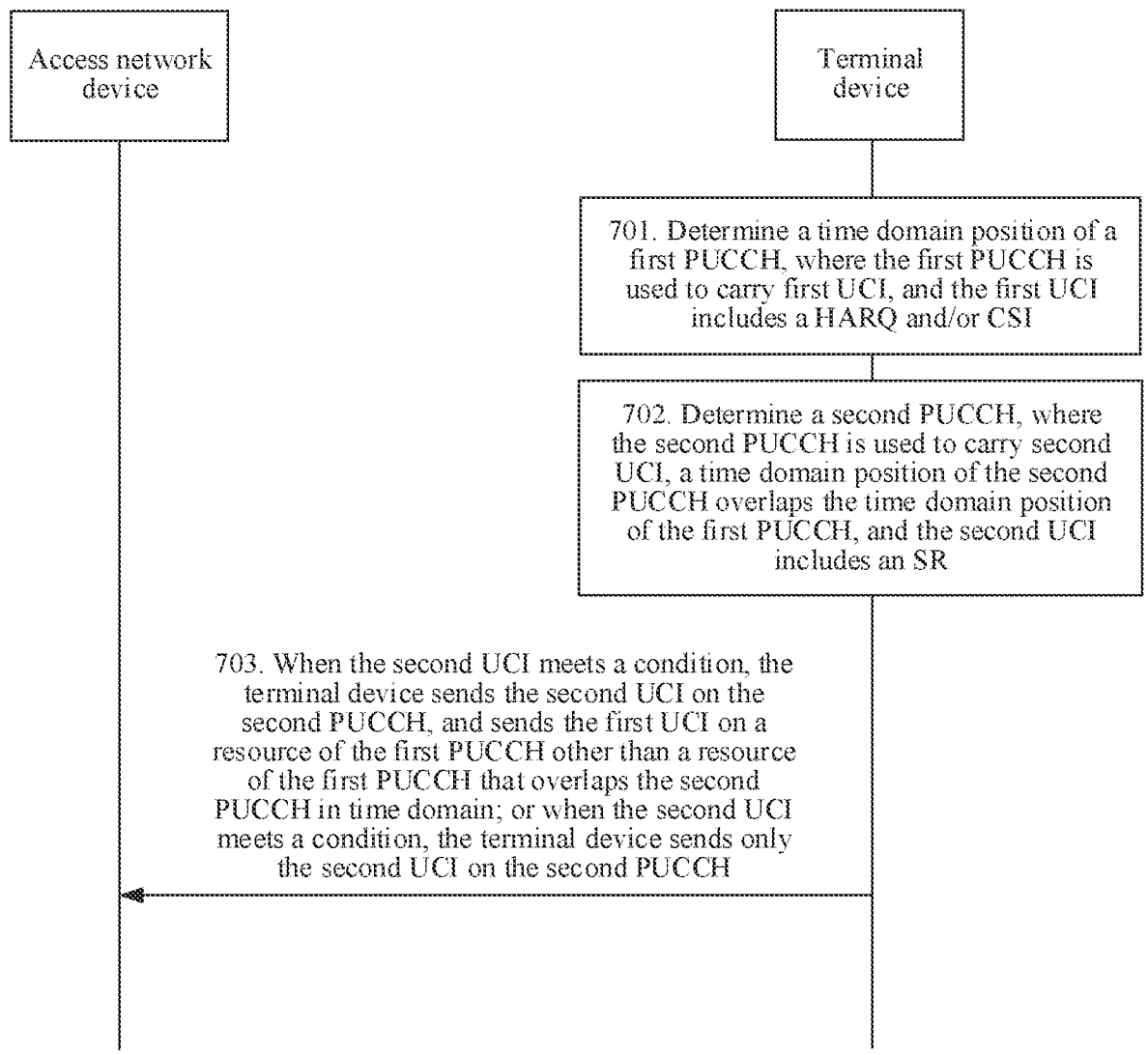
FIG. 7 is a schematic flowchart of another uplink control information transmission method according to an embodiment of the present application.

An embodiment of the present application further provides an uplink control information transmission method. As shown in FIG. 7, the method includes the following steps.

701. A terminal device determines a time domain position of a first PUCCH, where the first PUCCH is used to carry first UCI, and the first UCI includes a HARQ and/or CSI.

702. The terminal device determines a second PUCCH, where the second PUCCH is used to carry second UCI, a time domain position of the second PUCCH overlaps the time domain position of the first PUCCH, and the second UCI includes an SR.

It should be noted that the second PUCCH is a PUCCH that is specified in a resource configuration and that is used to carry an SR. In addition, when the second UCI is in a positive state, it may be considered that the SR included in the second UCI is also in a positive state.

In addition, the second UCI carried by the second PUCCH in step 702 may be in a positive state or a negative state. This is not limited in this embodiment of the present application.

703. When the second UCI meets a condition, the terminal device sends the second UCI on the second PUCCH, and sends the first UCI on a resource of the first PUCCH other than a resource of the first PUCCH that overlaps the second PUCCH in time domain; or when the second UCI meets a condition, the terminal device sends only the second UCI on the second PUCCH.

In other words, in some conditions, the terminal device separately sends the second UCI, and does not send the first UCI, or sends the first UCI at a time domain position at which the first PUCCH does not overlap the second PUCCH, to preferentially ensure sending of the second UCI, and avoid a latency of an uplink service of the terminal device caused because an SR has not been sent to an access network device.

During specific implementation, the determining condition in step 703 may be any one of the following:

(1) A priority of the second UCI is greater than or equal to a first threshold, where the first threshold may be configured by a higher layer, predefined, or dynamically indicated.

The priority of the second UCI is a priority of a resource configuration corresponding to the second UCI. Further, the priority of the resource configuration is configured by the higher layer or predefined. Certainly, the priority of the resource configuration may alternatively be determined based on one or more of the following information: a transmission period of the resource configuration, a format of a second PUCCH corresponding to the resource configuration, a time domain resource occupied by the second PUCCH corresponding to the resource configuration, a resource configuration index corresponding to the resource configuration, an index of a logic channel group corresponding to the resource configuration, and a priority of the logic channel group corresponding to the resource configuration.

The transmission period of the resource configuration is a transmission period of a PUCCH carrying an SR in the resource configuration.

It can be learned that when the priority of the second UCI is relatively high, the second UCI and the HARQ/CSI may not be jointly coded and transmitted, but the second UCI is separately transmitted, to ensure that an uplink data service of the terminal device is not affected.

(2) A period of the second UCI is less than or equal to a second threshold, where the second threshold may be configured by the higher layer, predefined, or dynamically indicated.

The period of the second UCI may be considered as a transmission period of a PUCCH that carries an SR and that is specified in the resource configuration corresponding to the second UCI.

When the period of the second UCI is less than or equal to the second threshold, it indicates that an uplink data service corresponding to the second UCI is relatively urgent and has a relatively high priority, and the second UCI may be separately transmitted, to respond to a request of the terminal device as soon as possible, and reduce a latency of the uplink data service of the terminal device.

(3) An end moment of the PUCCH corresponding to the second UCI is earlier than an end moment of the first PUCCH, and an absolute value of a difference between the end moment of the second PUCCH and the end moment of the first PUCCH is greater than or equal to a third threshold, where the third threshold may be configured by the higher layer, predefined, or dynamically indicated.

A premise of meeting the condition (3) is that if the first UCI and the second UCI are jointly coded and transmitted, only after receiving of the first PUCCH ends, the access network device can obtain the second UCI, and can allocate an uplink transmission resource to the terminal device based on the SR in the second UCI. However, if the second UCI is separately sent, the access network device may obtain the second UCI earlier. Because the difference between the end moment of the second PUCCH and the end moment of the first PUCCH is excessively large, if the first UCI and the second UCI are jointly coded and sent, the latency of the uplink data service is greatly increased. Therefore, the second UCI may be separately sent via the second PUCCH when the condition (3) is met.

(4) A start moment of the second PUCCH corresponding to the second UCI is later than a start moment of the first PUCCH, and an absolute value of a difference between the start moment of the second PUCCH and the start moment of the first PUCCH is greater than or equal to a fourth threshold, where the fourth threshold may be configured by the higher layer, predefined, or dynamically indicated.

If the difference between the start moment of the second PUCCH and the start moment of the first PUCCH is excessively large, when the first UCI is sent, the first UCI and the second UCI may not be jointly coded in time. Therefore, the second UCI may be separately sent via the second PUCCH.

(5) The second UCI is carried on at least two second PUCCHs.

If the second UCI in step 702 is carried on the at least two second PUCCHs, it indicates that at the time domain position corresponding to the first PUCCH, there are at least two PUCCHs carrying the second UCI. This further indicates that the uplink data service corresponding to the second UCI is relatively urgent and has a relatively high priority. Therefore, the second UCI may be separately sent via the second PUCCH, to ensure that the uplink data service of the terminal device is not affected.

It should be noted that time domain positions of second PUCCHs corresponding to a plurality of resource configurations overlap the time domain position of the first PUCCH. The terminal device may execute the decision in step 703 for second UCI corresponding to each of the resource configurations, and send, after determining that the condition is met, the second UCI corresponding to the resource configuration.

In the embodiments of the present application, first UCI and second UCI are different types of uplink control information. The following describes, by using an example in which the first UCI is a HARQ and the second UCI is an SR, several uplink control information transmission methods provided in the embodiments of the present application.

In some embodiments, there is a transmission conflict between a HARQ and SRs, and there is no intersection between PUCCHs carrying the SRs. A terminal device may select one or more SRs from the SRs, to joint code and transmit the one or more selected SRs and the HARQ.

Figure 8:
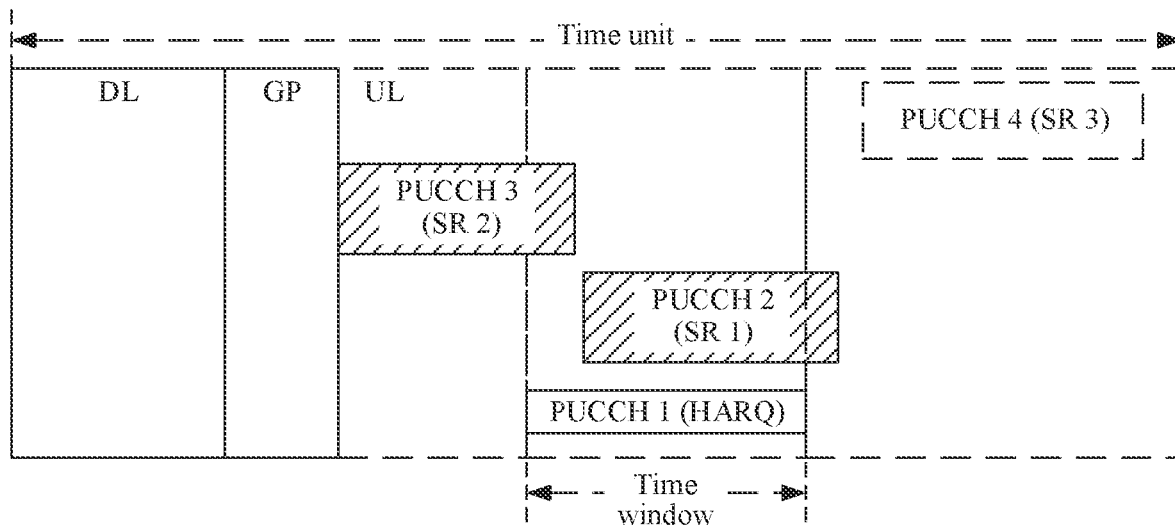
FIG. 8 is a time-domain schematic diagram of an uplink control information transmission method according to an embodiment of the present application.

For example, referring to FIG. 8, one slot is used as an example, and the HARQ is carried on a PUCCH 1. A time window corresponding to the PUCCH 1 is aligned with a time domain position of the PUCCH 1. The terminal device has PUCCHs of three resource configurations in a current slot. The PUCCHs include a PUCCH 2, a PUCCH 3, and a PUCCH 4. The PUCCH 2 carries an SR corresponding to a first resource configuration, where the SR is denoted as an SR 1. The PUCCH 3 carries an SR corresponding to a second resource configuration, where the SR is denoted as an SR 2. The PUCCH 4 carries an SR corresponding to a third resource configuration, where the SR is denoted as an SR 3.

Further, referring to FIG. 8, the PUCCH 2 and the PUCCH 3 in the PUCCH 2, the PUCCH 3, and the PUCCH 4 overlap the PUCCH 1. Therefore, one of the SR 1 and the SR 2 that respectively correspond to the PUCCH 2 and the PUCCH 3 may be selected, to jointly code the selected one and the HARQ. In this embodiment of the present application, a set including the SR 2 and the SR 3 is denoted as a candidate SR set.

In addition, priorities of the foregoing three resource configurations meet: a priority of the first resource configuration>a priority of the second resource configuration>a priority of the third resource configuration. It can be learned that a priority of the SR 2 is higher than a priority of the SR 3. Therefore, the SR 2 and the HARQ may be jointly coded.

Certainly, an SR may alternatively be selected from a plurality of SRs based on activation statuses and priorities of the SRs, where the selected SR and the HARQ are jointly coded. For example, if the SR 2 is in a negative state, and the SR 3 is in a positive state, the SR 3 and the HARQ are jointly coded. Certainly, if a plurality of SRs are in a positive state, an SR having a highest priority is selected, to jointly code the SR and the HARQ.

During specific implementation, the terminal device may add state information and/or index information of an SR before or after a position of information bits corresponding to the HARQ. The index information of the SR may be index information of a resource configuration corresponding to the SR. Specifically, the SR 2 is used as an example. Index information of the SR 2 may be index information of the resource configuration corresponding to the SR 2, that is, an index of the second resource configuration in a plurality of resource configurations supported by an access network device, or an index of the second resource configuration in a plurality of resource configurations supported by the terminal device UE. Certainly, the index information of the SR may alternatively be index information of the SR 2 in the candidate SR set.

It should be noted that resource configuration may be numbered in descending order of priorities of the resource configurations, resource configuration may be numbered in ascending order of priorities of the resource configurations, or indexes of resource configurations may be predetermined by the access network device. Because all behavior of the UE is controlled by a gNB, the gNB knows a quantity of bits required for number indication information, and also knows a meaning of each number.

An example in which the index information of the SR is the index information of the SR 2 in the candidate SR set is used. SRs are numbered from 0 in descending order of priorities, an index of the SR 1 is 0, and an index of the SR 2 is 1.

In some embodiments, there is a transmission conflict between a HARQ and SRs, and there is an intersection between PUCCHs carrying the SRs. A terminal device may select one or more SRs from the SRs, to jointly code and transmit the one or more selected SRs and the HARQ.

Figure 9A:
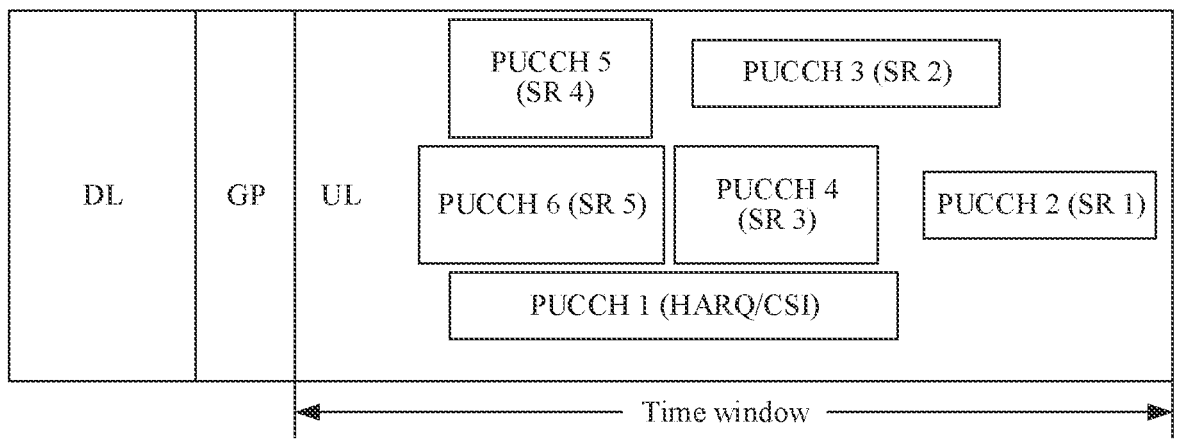
FIG. 9a is another time-domain schematic diagram of an uplink control information transmission method according to an embodiment of the present application.
Figure 9B:
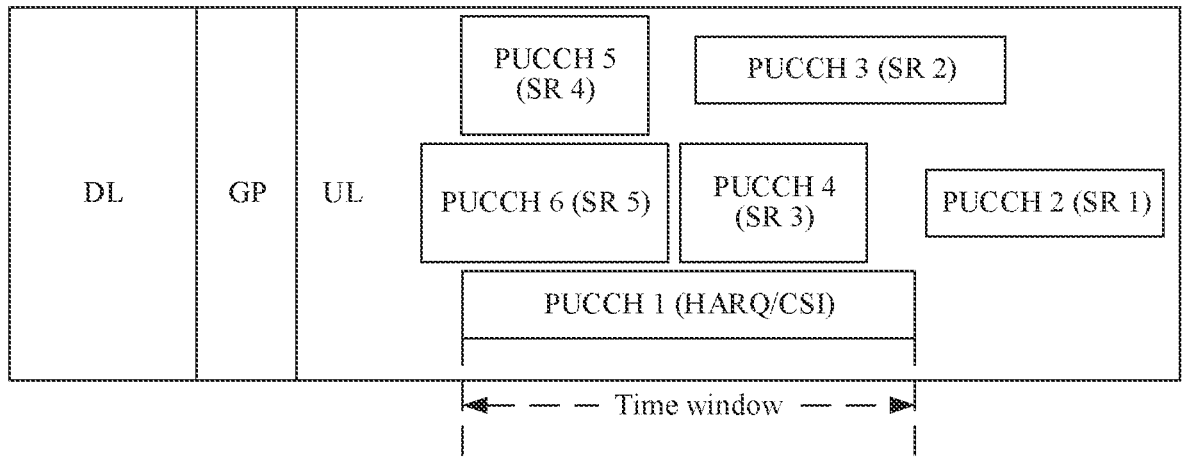
FIG. 9b is another time-domain schematic diagram of an uplink control information transmission method according to an embodiment of the present application.

In the embodiments of the present application, one slot is used as an example to describe which SR is selected to jointly code and transmit the SR and the HARQ. As shown in FIG. 9a or FIG. 9b, the terminal device has PUCCHs of five resource configurations in a current slot. The PUCCHs include a PUCCH 2, a PUCCH 3, a PUCCH 4, a PUCCH 5, and a PUCCH 6. The PUCCH 2 carries an SR corresponding to a first resource configuration, where the SR is denoted as an SR 1. The PUCCH 3 carries an SR corresponding to a second resource configuration, where the SR is denoted as an SR 2. The PUCCH 4 carries an SR corresponding to a third resource configuration, where the SR is denoted as an SR 3. The PUCCH 5 carries an SR corresponding to a fourth resource configuration, where the SR is denoted as an SR 4. The PUCCH 6 is used to carry an SR corresponding to a fifth resource configuration, where the SR is denoted as an SR 5.

For example, referring to FIG. 9a, the HARQ is carried on the PUCCH 1, and a time window corresponding to the PUCCH 1 may be aligned with an uplink (UL) part of a time unit in which the PUCCH 1 is located. Referring to FIG. 9b, the time window corresponding to the PUCCH 1 may be aligned with a time domain position of the PUCCH 1.

After determining the time window, the terminal device may further determine a candidate SR set based on the time window.

In an implementation, SRs corresponding to PUCCHs overlapping the PUCCH 1 may be selected into the candidate SR set.

Figure 9C:
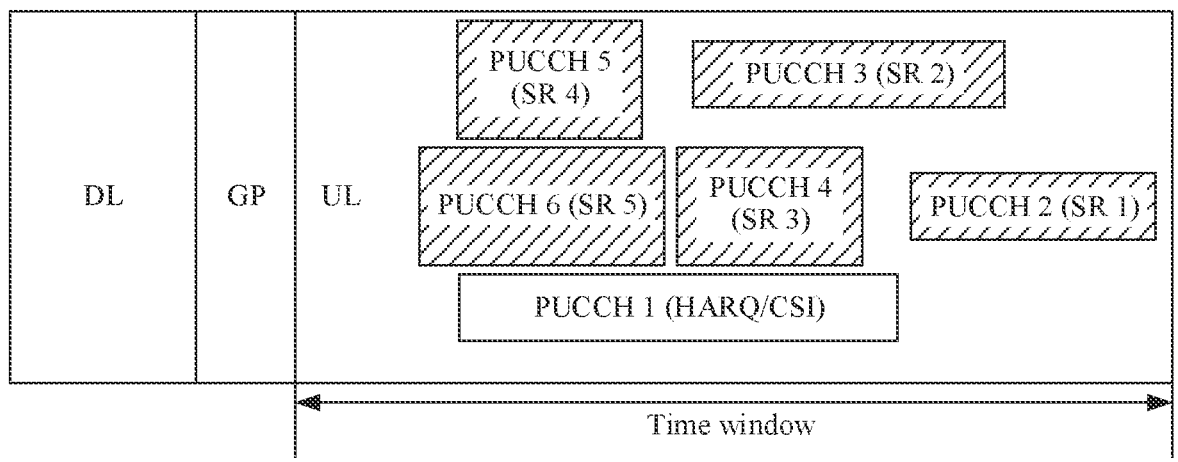
FIG. 9c is another time-domain schematic diagram of an uplink control information transmission method according to an embodiment of the present application.

For example, based on the time window shown in FIG. 9a, the PUCCH 2, the PUCCH 3, the PUCCH 4, the PUCCH 5, and the PUCCH 6 all overlap the time window, and as shown in FIG. 9c, the candidate SR set includes the SR 1, the SR 2, the SR 3, the SR 4, and the SR 5.

Figure 9D:
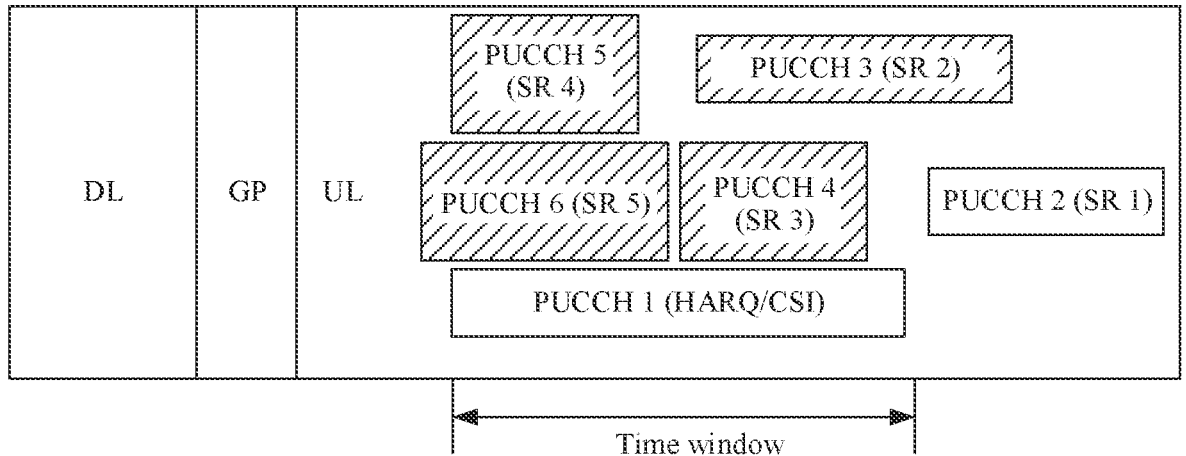
FIG. 9d is another time-domain schematic diagram of an uplink control information transmission method according to an embodiment of the present application.

Based on the time window shown in FIG. 9b, the PUCCH 3, the PUCCH 4, the PUCCH 5, and the PUCCH 6 all overlap the time window, and as shown in FIG. 9d, the candidate SR set includes the SR 2, the SR 3, the SR 4, and the SR 5.

In an implementation, SRs corresponding to PUCCHs that overlap the PUCCH 1 and whose start moments are not later than a start moment of the PUCCH 1 may be selected into the candidate SR set.

Figure 9E:
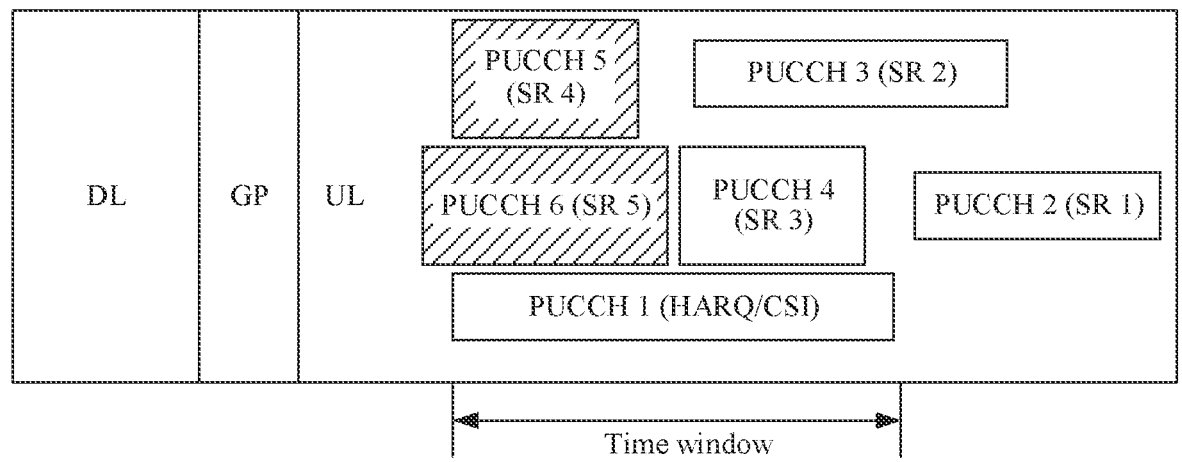
FIG. 9e is another time-domain schematic diagram of an uplink control information transmission method according to an embodiment of the present application.

Based on the time window shown in FIG. 9b, the PUCCH 5 and the PUCCH 6 overlap the time window, and start moments of the PUCCH 5 and the PUCCH 6 is not later than the start moment of the PUCCH 1. As shown in FIG. 9e, the candidate SR set includes the SR 4 and the SR 5.

In addition, priorities of the foregoing five resource configurations meet: a priority of the first resource configuration>a priority of the second resource configuration>a priority of the third resource configuration>a priority of the fourth resource configuration>a priority of the fifth resource configuration. It can be learned that a priority of the SR 2 is higher than a priority of the SR 3. Therefore, the SR 2 and the HARQ may be jointly coded.

Certainly, an SR may alternatively be selected from a plurality of SRs based on activation statuses and priorities of the SRs, where the selected SR and the HARQ are jointly coded. For example, if the SR 2 is in a negative state, and the SR 3 to the SR 5 are in a positive state, the SR 3 having a highest priority in the SR 3 to the SR 5 and the HARQ are jointly coded.

During specific implementation, the terminal device may add state information and/or index information of the SR 3 before or after a position of information bits corresponding to the HARQ. The index information of the SR 3 may be index information of the resource configuration corresponding to the SR 3. Specifically, the index information of the SR 3 may be the index information of the resource configuration corresponding to the SR 3, that is, an index of the third resource configuration in a plurality of resource configurations supported by an access network device, or an index of the third resource configuration in a plurality of resource configurations supported by the terminal device UE. Certainly, the index information of the SR 3 may alternatively be index information of the SR 3 in the candidate SR set.

In an implementation, it is assumed that the candidate SR set includes X SRs. Therefore, $\lceil \log_2 X \rceil$ bits are required to identify an index of one SR. $\lceil \ \rceil$ represents a round-up operation. For example, if there are five SRs in the candidate SR set, three bits are required to indicate index information of one SR. For example, the SRs in the candidate SR set are numbered from 0 in descending order of priorities. An index of an SR 1 is 000, an index of an SR 2 is 001, an index of an SR 3 is 010, and so on.

During specific implementation, a bit 0 may be used to indicate that an SR is in a positive state, and a bit 1 may be used to indicate that the SR is in a negative state. Therefore, state information "0" and the index information "010" of the SR 3 may be added before or after a position of information bits corresponding to the HARQ, to obtain to-be-sent information bits, and the to-be-sent information bits are transmitted via the PUCCH 1.

According to the method provided in the embodiments of the present application, in a scenario in which PUCCH resources of SRs are not aligned with a PUCCH resource of a HARQ/CSI in time domain, a time window is introduced to determine a candidate SR set, to select an SR from the candidate SR set, where the SR and the HARQ/CSI are jointly coded and transmitted.

In some embodiments, there is a transmission conflict between a HARQ and SRs, and PUCCHs carrying the HARQ are nonconsecutive in time domain. In this scenario, a terminal device may select one or more SRs from the SRs, to jointly code and transmit the one or more selected SRs and the HARQ.

Figure 10A:
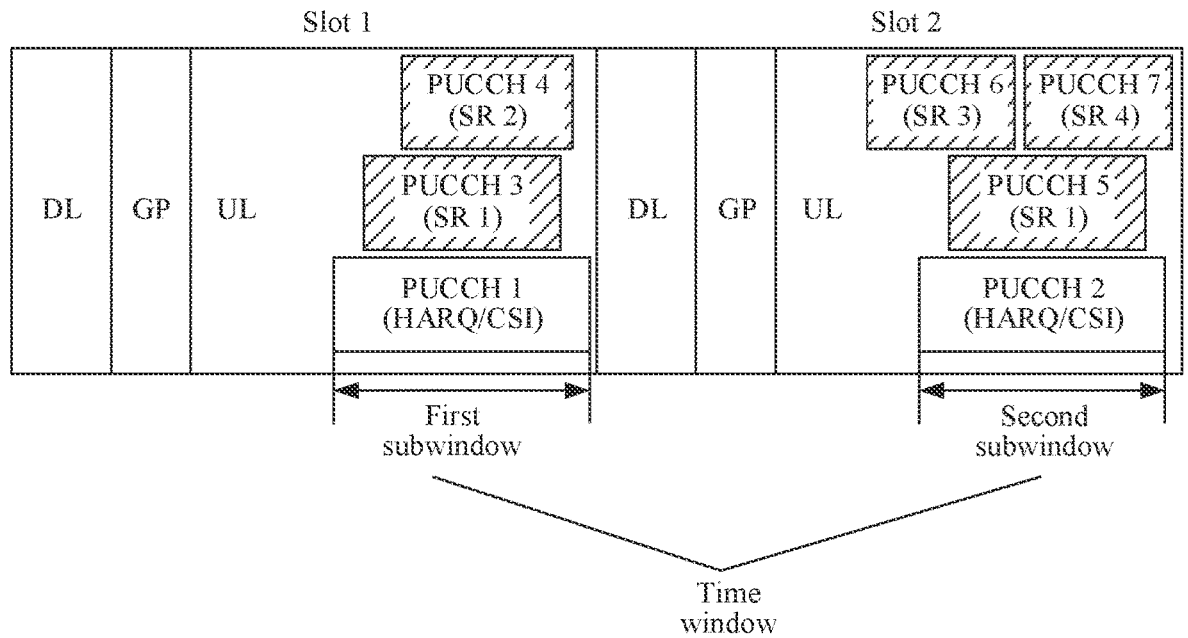
FIG. 10a is another time-domain schematic diagram of an uplink control information transmission method according to an embodiment of the present application.
Figure 10B:
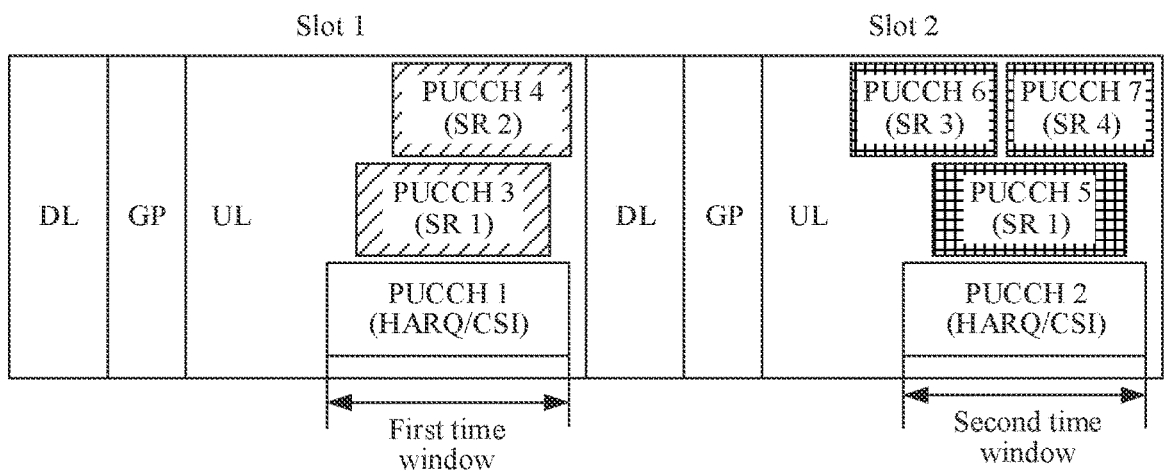
FIG. 10b is another time-domain schematic diagram of an uplink control information transmission method according to an embodiment of the present application.

Referring to FIG. boa and FIG. 10b, the terminal device sends the HARQ via a PUCCH 1 in a slot 1, and sends the HARQ via a PUCCH 2 in a slot 2 adjacent to the slot 1. The PUCCH 1 and the PUCCH 2 are nonconsecutive in time domain, but carries same HARQ information. The terminal device has PUCCHs of two resource configurations in the slot 1, and the PUCCHs include a PUCCH 3 and a PUCCH 4. The PUCCH 3 carries an SR 1, and the PUCCH 4 carries an SR 2. The terminal device has PUCCHs of three resource configurations in the slot 2, and the PUCCHs include a PUCCH 5, a PUCCH 6, and a PUCCH 7. The PUCCH 5 carries the SR 1, the PUCCH 6 carries an SR 3, and the PUCCH 7 carries an SR 4.

Referring to FIG. boa, a time window determined by the terminal device is a discontinuous time window, and includes two pails, to be specific, a first subwindow and a second subwindow shown in FIG. boa. The first subwindow is aligned with a time domain position of the PUCCH 1, and the second subwindow is aligned with a time domain position of the PUCCH 2.

Referring to FIG. 10b, the terminal device determines two independent time windows: a first time window and a second time window. The first time window is aligned with the time domain position of the PUCCH 1, and the second time window is aligned with the time domain position of the PUCCH 2.

Then, the terminal device may determine a candidate SR set based on the determined time window. It is assumed that SRs corresponding to PUCCHs overlapping the PUCCHs carrying the HARQ are added to the candidate SR set.

Specifically, referring to FIG. boa, a candidate SR set is determined, and includes the SR 1, the SR 2, the SR 3, the SR 4, and the SR 5. The SR 1 having a highest priority and the HARQ are jointly coded and sent via the PUCCH 1 and the PUCCH 2 separately.

Referring to FIG. 10b, two candidate SR sets are determined. A candidate SR set determined based on the first time window includes the SR 1 and the SR 2. A candidate SR set determined based on the second time window includes the SR 3, the SR 4, and the SR 5. For the two candidate SR sets, SRs each having a highest priority in the two candidate SR sets and the HARQ are separately jointly coded and sent. For example, the SR 1 and the HARQ on the PUCCH 1 are jointly coded and sent via the PUCCH 1, and the SR 3 and the HARQ on the PUCCH 2 are jointly coded and sent via the PUCCH 2.

In some embodiments, both M and N are integers greater than or equal to 1. A first PUCCH carrying a HARQ or CSI is repeated in L time units. As shown in FIG. we to FIG. 10f, first PUCCHs occupy four continuous time domain resources in four slots in time domain. For example, one continuous time domain resource is two OFDM symbols. The four slots occupied by the first PUCCHs are the L time units in the embodiments of the present application. In the four slots occupied by the first PUCCHs, the continuous time domain resources have a same start position and length. For example, the continuous time domain resource is the third and the fourth OFDM symbols in a slot. The first PUCCHs separately carry the first UCI on the four continuous time domain resources in the four slots.

Further, when the first PUCCH overlaps a second PUCCH carrying an SR in time domain, state information and/or index information of the SR may be added to first PUCCHs in one time unit or first PUCCHs in the L time units, to transmit the state information and/or the index information. In some embodiments, the first PUCCH carries the HARQ or the CSI, and the carried HARQ or CSI owns a large quantity of information bits, for example, greater than 2 bits. In this case, the first PUCCH is a long PUCCH format, for example, a PUCCH format 3 or a PUCCH format 4 in NR, or may be a short PUCCH format, for example, a PUCCH format 2 in NR. In this case, a terminal device separately codes the first UCI on the four continuous time domain resources in the foregoing four slots, and separately modulates and transmits same or different redundancy versions obtained through coding. Specifically, an implementation in which the terminal device jointly sends the first UCI and the second UCI on the first PUCCH may be: adding the state information and/or the index information of the SR to the first PUCCHs in the four slots, for joint coding and transmission, as shown in FIG. 10c, FIG. 10d, FIG. 10e, and FIG. 10f.

Specifically, the terminal device first determines a first time window based on the time domain positions of L continuous time domain resources that are in the L time units and on which the first PUCCHs are located. In the embodiments, it is assumed that the first time window is aligned with the time domain positions of the L continuous time domain resources in the L time units. Then, the terminal device determines N second PUCCHs overlapping the first time window (that is, the L continuous time domain resources in the L time units) in time domain. The N second PUCCHs correspond to M SR resource configurations. In the embodiments, the first time window is aligned with the four continuous time domain resources in the four slots. Further, the N second PUCCHs and the M resource configurations overlap the first time window in time domain.

Figure 10C:
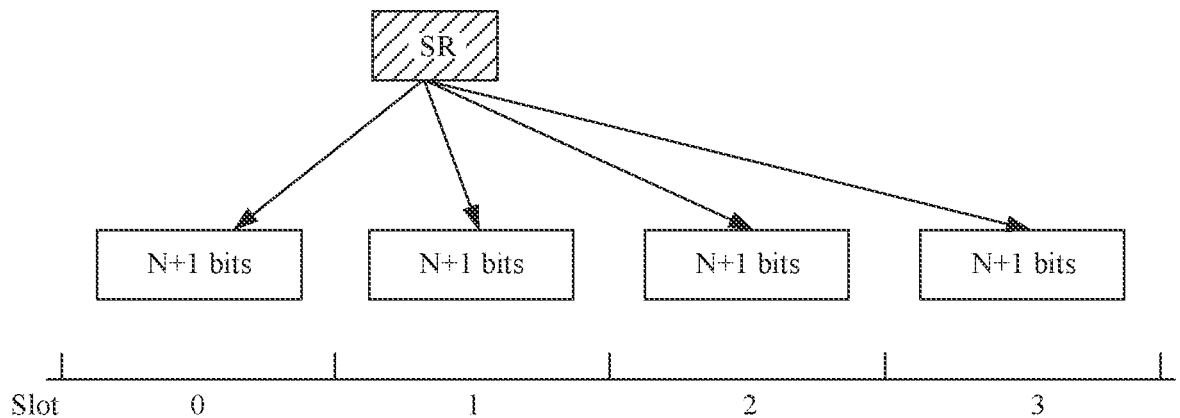
FIG. 10c is another time-domain schematic diagram of an uplink control information transmission method according to an embodiment of the present application.

In FIG. 10c, M=N=1. A corresponding SR is in a positive state. The terminal device adds i-bit SR state information to all the first PUCCHs in the L time units, to transmit the SR state information. That is, all the first PUCCHs in each time unit carry the i-bit SR state information.

Figure 10D:
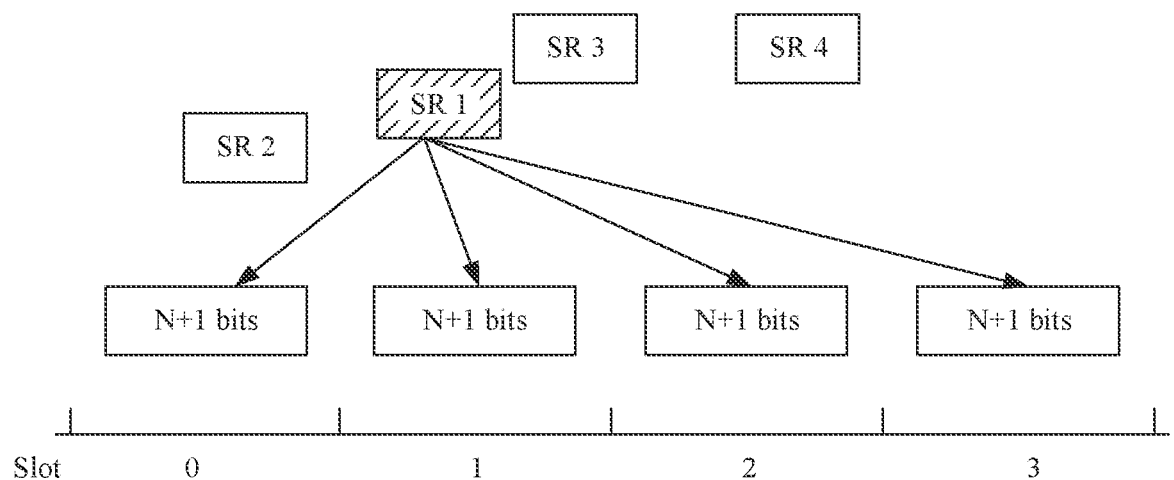
FIG. 10d is another time-domain schematic diagram of an uplink control information transmission method according to an embodiment of the present application.
Figure 10E:
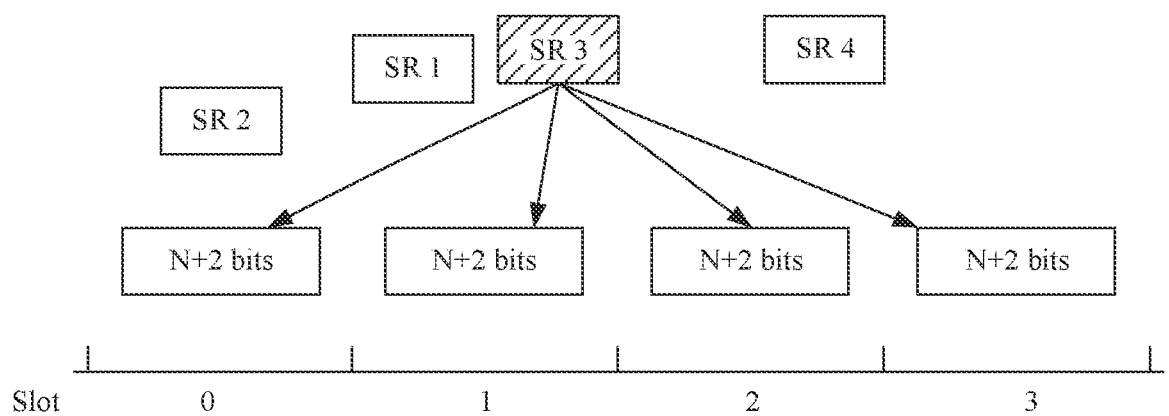
FIG. 10e is another time-domain schematic diagram of an uplink control information transmission method according to an embodiment of the present application.
Figure 10F:
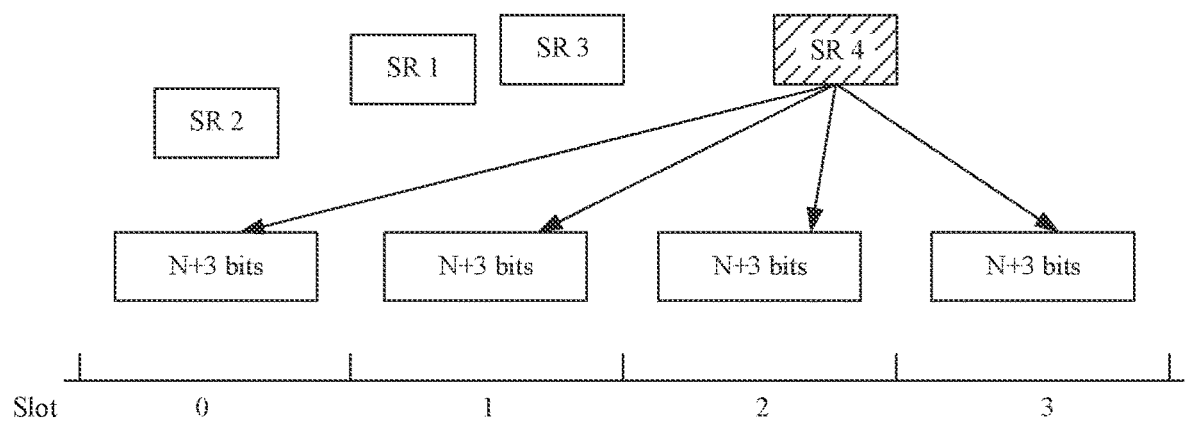
FIG. 10f is another time-domain schematic diagram of an uplink control information transmission method according to an embodiment of the present application.

In FIG. 10d, FIG. 10e, and FIG. 10f, the first time window is aligned with the four continuous time domain resources in the four slots. Further, four second PUCCHs overlap the first time window in time domain. The four second PUCCHs correspond to four SR resource configurations: an SR 1 to an SR 4. The SR 1 and the SR 2 are in a negative state, the SR 3 and the SR 4 are in a positive state, and priorities of the SR 1 to the SR 4 are in descending order. In this case, N=M=4.

Furthermore, the terminal device may further determine at least one of the M SR resource configurations, and add, to all the first PUCCHs in the L time units, state information and/or index information of an SR corresponding to the at least one SR resource configuration, to transmit the state information and/or the index information. Referring to FIG. 10d, the terminal device may always select an SR resource configuration having a highest priority, for example, the SR 1, and add, to all the first PUCCHs in the L time units, state information of an SR corresponding to the resource configuration, to transmit the state information. In this case, only one bit is added before or after a position of the information bits of the HARQ/CSI to indicate a state of the SR having the highest priority. As shown in FIG. 10d, the joint information may be N+1 bits, where N herein is an original quantity of information bits of the first UCI.

As shown in FIG. 10e, the terminal device may alternatively always select an SR resource configuration in a positive state and having a highest priority, for example, the foregoing SR 3. Index information of an SR corresponding to the resource configuration is added to the first PUCCH, for transmission. In this case, $\lceil \log_2 M \rceil$ bits are used to indicate the index information of the SR. In this embodiment, the N second PUCCHs determined based on the first time window correspond to four SR resource configurations. That is, M=$_4$. Therefore, $\lceil \log_2 4 \rceil$ bits are used to indicate the index information of the SR. For example, "00", "01", "10", and "11" respectively indicate an SR 1, an SR 2, an SR 3, and an SR 4, and implicitly indicate that the SR indicated by the two bits is in a positive state. Further, in this case, only two bits are added before or after a position of the information bits of the HARQ/CSI to indicate the state of the SR having the highest priority. As shown in FIG. 10e, the joint information may be N+2 bits, where N herein is the original quantity of the information bits of the first UCI.

As shown in FIG. 10f, the terminal device may further use $\lceil \log_2(M+1) \rceil$ bits to indicate state information and index information of SRs corresponding to the M SR resource configurations. Specifically, one state is used to indicate that all the SRs are in a negative state, and M other states are used to indicate that M SRs are in a positive state successively. In this embodiment, M=$_4$. Therefore, $\lceil \log_2(1+44) \rceil$=3 bits are used to indicate the state information and the index information of the SRs. For example, '000' indicates that all SRs corresponding to four resource configurations are in a negative state, and four other values, for example, '001', 'ow', 'on', and '100', respectively indicate that SRs corresponding to resource configurations, that is, an SR 1, an SR 2, an SR 3, and an SR 4, are in a positive state. In this case, only three bits are added before or after a position of the information bits of the HARQ/CSI to indicate the state of the SR having the highest priority. As shown in FIG. 10f, the joint information may be N+$_3$ bits, where N herein is the original quantity of the information bits of the first UCI.

In some other cases, both M and N are integers greater than or equal to 1. The first PUCCH carries the HARQ, and a quantity of information bits of the carried HARQ is relatively small, for example, less than or equal to 2 bits. In this case, the first PUCCH is a short PUCCH format, for example, a PUCCH format 0 in NR. In this case, the terminal device maps the first UCI into different cyclic shifts of a specified sequence, and sends the corresponding sequence on the first PUCCH to represent the first UCI. Alternatively, the first PUCCH is a long PUCCH format, for example, a PUCCH format 1 in NR. In this case, the terminal device codes and modulates the first UCI, and multiplies a coded and modulated symbol by a specified sequence, to jointly send the symbol multiplied by a specified sequence and a reference signal sequence on the first PUCCH. In this case, an implementation method in which the terminal device jointly sends the first UCI and the second UCI on the first PUCCH is to add the state information and/or the index information of the SR to the first PUCCHs in one time unit, to transmit the state information and/or the index information.

Figure 10G:
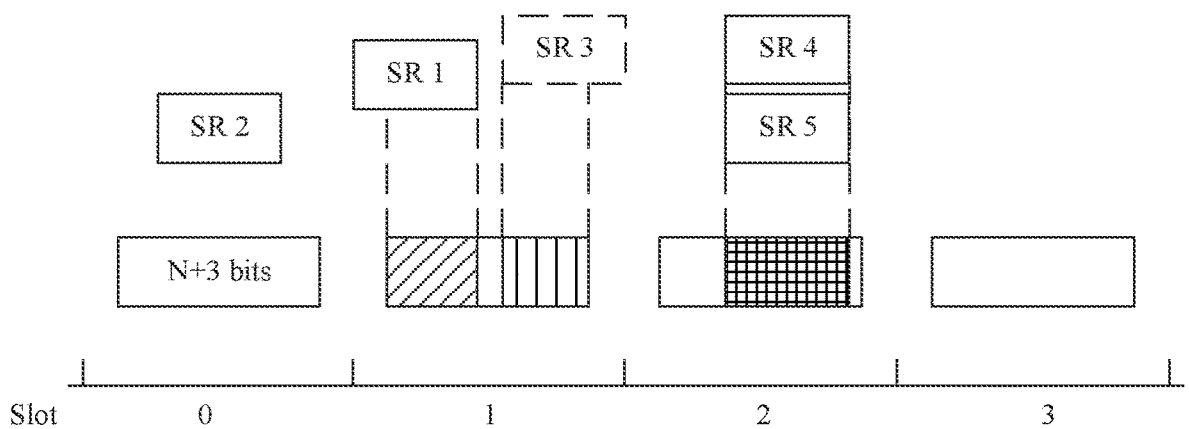
FIG. 10g is another time-domain schematic diagram of an uplink control information transmission method according to an embodiment of the present application.

Specifically, the terminal device successively jointly transmits HARQs in each time unit and the SR. For each of the L time units, the terminal device determines a time domain position of the time domain resource that is in the time unit and on which the first PUCCHs are located, determines a first time window based on the time domain position, and determines N second PUCCHs based on the first time window. The N second PUCCHs correspond to M SR resource configurations. For example, in FIG. 10g, it is assumed that an SR 1 to an SR 5 correspond to different SR resource configurations. For a time unit 0 (that is, a slot 0), the terminal device determines that N=M=1. For a time unit 1 (that is, a slot 1) and a time unit 2 (that is, a slot 2), the terminal device determines that N=M=2. For a time unit 3 (that is, a slot 3), the terminal device determines that N=M=0.

Then, for each time unit, the terminal device determines at least one of the M SR resource configurations, and adds, to the first PUCCHs in the time unit, state information and/or index information of an SR corresponding to the at least one SR resource configuration, to transmit the state information and/or the index information. In this case, second PUCCHs corresponding to the at least one resource configuration selected by the terminal device does not overlap in time domain. For example, in the slot 2, the at least one resource configuration selected by the terminal device is resource configurations corresponding to the SR 2 and the SR 3. In the slot 3, the at least one resource configuration selected by the terminal device is one of two resource configurations corresponding to the SR 4 and the SR 5.

In the slot 1, because second PUCCHs of the SR 2 and the SR 3 do not overlap in time domain, the terminal device transmits, for the SR 2 and the SR 3, the first UCI and corresponding SR state information on first time domain symbols occupied by first PUCCHs of the SR 2 and the SR 3. Specifically, the terminal device sends a corresponding control information sequence and/or reference signal sequence by using an original time domain cyclic shift c0 of the first PUCCHs in the slot 1. For the SR 2, the terminal device sends the first UCI and state information of the SR 2 on a corresponding first time domain symbol (that is, a symbol in a region 1 in FIG. 10g). Because the SR 2 is in a positive state, the terminal device sends a control information sequence and a reference signal sequence on the first time domain symbol by using a cyclic shift c0+1. Similarly, for the SR 3, the terminal device sends the first UCI and state information of the SR 3 on a corresponding first time domain symbol (that is, a symbol in a region 2 in FIG. 10g). Because the SR 3 is in a positive state, the terminal device sends a control information sequence and a reference signal sequence on the first time domain symbol by using a cyclic shift c0+1.

In the slot 2, because second PUCCHs of the SR 4 and the SR 5 overlap in time domain, the terminal device selects one of the SR 4 and the SR 5, for transmission, and transmits state information and resource configuration index information of the selected one on a first time domain symbol. The first time domain symbol herein is a symbol in the region 3 in FIG. 10g. In this case, there are three cyclic shift values of a control information sequence and/or a reference signal sequence on the first time domain symbol, and the values are c0, c1, and c2. The cyclic shift c0 indicates that when both the SR 4 and the SR 5 are in a negative state, the terminal device sends the corresponding control information sequence and/or reference signal sequence on the first time domain symbol by using an original cyclic shift. The cyclic shift c1 indicates that the SR 4 is in a positive state, and a state of the SR 5 is unknown (which may be a negative state by default). Similarly, the cyclic shift c2 indicates that the SR 5 is in a positive state, and a state of the SR 4 is unknown (which may be a negative state by default). An implementation method is c1=c0+1, and C2=C0+2. The cyclic shifts c1 and c2 obtained though adding need to be selected from a supported cyclic shift set. When a largest cyclic shift value is exceeded, a modulo operation is performed. For example, if the supported cyclic shifts are {0, 1, . . . , 11}, when the cyclic shifts obtained though adding are: c1=13, and c2=14, actual cyclic shifts are: c1=13mod2=1 and c2=14mod2=2. mod represents the modulo operation.

In some embodiments, if a priority of a resource configuration corresponding to an SR is quite high, or a data service latency requirement corresponding to an SR is quite high, the SR may be preferentially transmitted, and a HARQ/CSI may be punctured for partial transmission or may not be transmitted.

One slot is used as an example. The HARQ is carried on a PUCCH 1. A time window corresponding to the PUCCH 1 is aligned with a time domain position of the PUCCH 1. Subsequently, a candidate SR set may be further determined based on the time window corresponding to the PUCCH 1. Specifically, an SR corresponding to a PUCCH overlapping the time domain position of the PUCCH 1 may be selected into the candidate SR set.

Figure 11A:
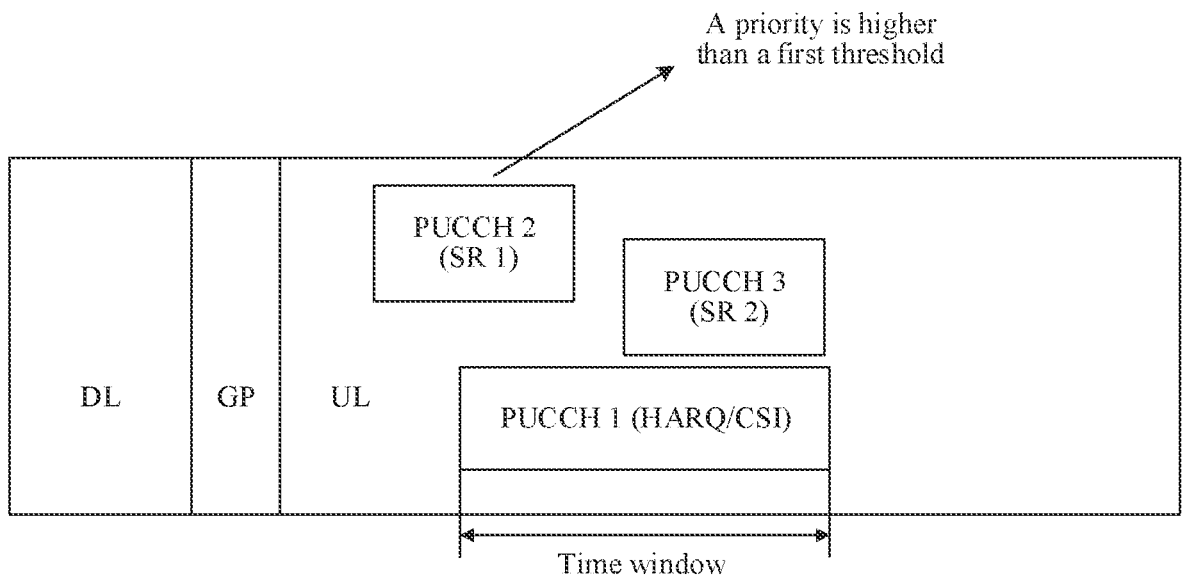
FIG. 11a is another time-domain schematic diagram of an uplink control information transmission method according to an embodiment of the present application.

Referring to FIG. 11a, time domain positions of a PUCCH 2 and a PUCCH 3 overlap a time domain position of a PUCCH 1. Therefore, an SR 1 and an SR 2 are added to a candidate SR set. Further, a priority of the SR 1 is higher than the first threshold Th1. When the priority of the SR 1 is relatively high, the SR 1 and the HARQ/CSI may not be jointly coded and transmitted, but the SR 1 is separately transmitted, to ensure that an uplink data service of the terminal device is not affected. Therefore, the SR 1 is transmitted via the PUCCH 2, and the HARQ/CSI is punctured for transmission, that is, transmitted in a part of the PUCCH 1 that does not overlap the PUCCH 2, or is not transmitted.

Figure 11B:
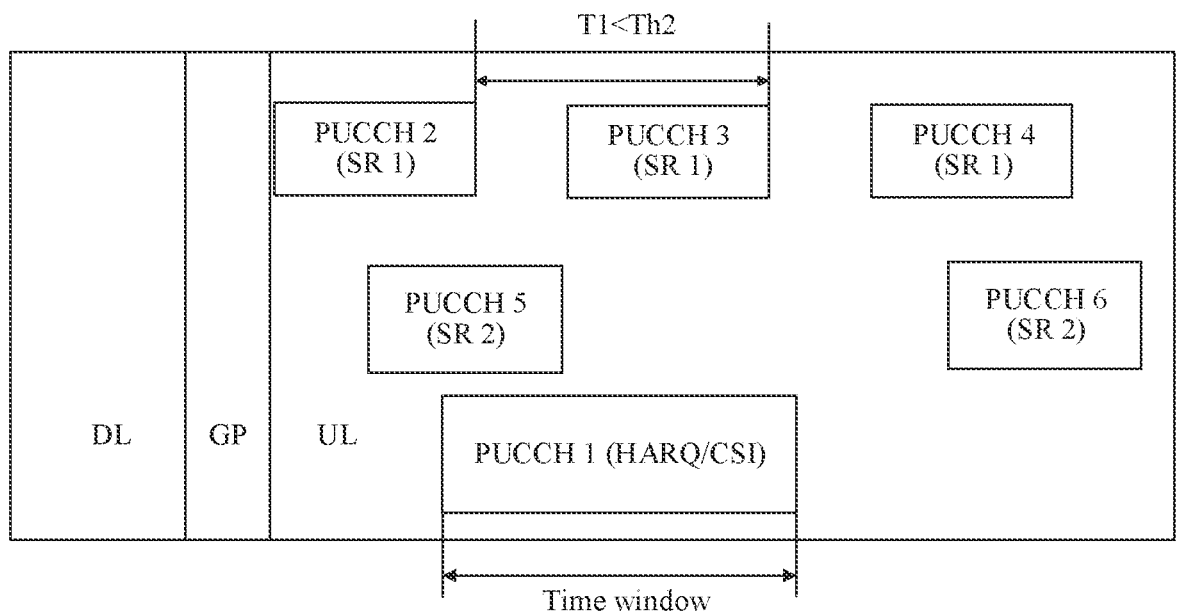
FIG. 11b is another time-domain schematic diagram of an uplink control information transmission method according to an embodiment of the present application.

Referring to FIG. 11b, a PUCCH 2, a PUCCH 3, and a PUCCH 4 separately carry an SR 1 of a same resource configuration, and a PUCCH 5 and a PUCCH 6 carry an SR 2 of another resource configuration. A time domain position of the PUCCH 1 overlaps time domain positions of the PUCCH 2, the PUCCH 3, and the PUCCH 5. Therefore, the SR 1 and the SR 2 are added to a candidate SR set. Further, because a period T1 of the SR1 (that is, a PUCCH transmission period specified in the first configuration) is less than or equal to a second threshold Th2, it indicates that an uplink data service corresponding to the SR 1 is relatively urgent and has a relatively high priority, and the SR1 may be separately transmitted, to respond to a request of a terminal device as soon as possible, and reduce a latency of an uplink data service of the terminal device. Therefore, the SR1 is transmitted via the PUCCH 2, and the HARQ/CSI is punctured for transmission, that is, transmitted in a part of the PUCCH 1 that does not overlap the PUCCH 2, or is not transmitted.

Figure 11C:
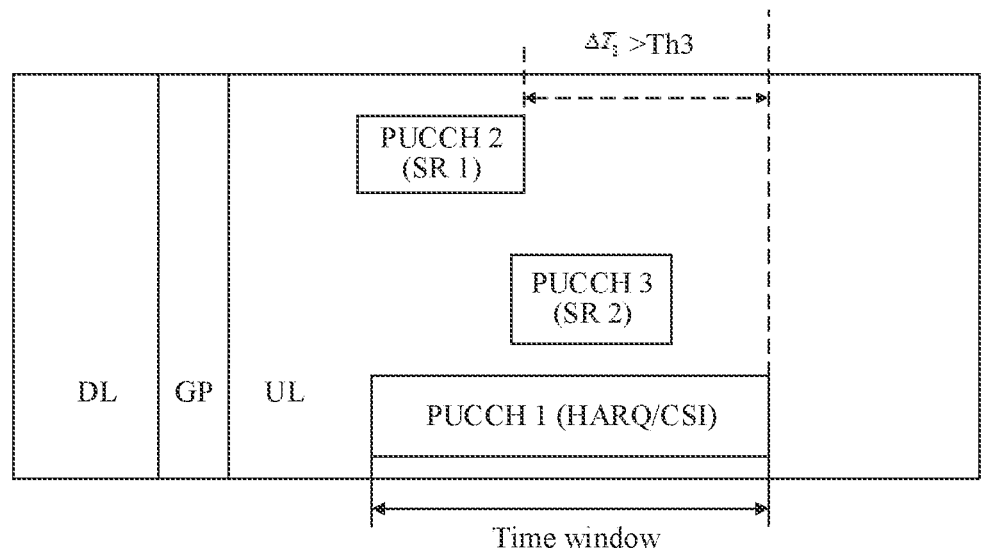
FIG. 11c is another time-domain schematic diagram of an uplink control information transmission method according to an embodiment of the present application.

Referring to FIG. 11c, time domain positions of a PUCCH 2 and a PUCCH 3 overlap a time domain position of a PUCCH 1. Therefore, an SR 1 and an SR 2 are added to a candidate SR set. Both an end moment of the PUCCH 2 and an end moment of the PUCCH 3 are earlier than an end moment of the PUCCH 1, but an absolute value of a difference $\Delta T_1$ between the end moment of the PUCCH 2 and the end moment of the PUCCH 1 is greater than a third threshold Th3. If the difference between the end moment of the PUCCH 2 and the end moment of the PUCCH 1 is excessively large, and the SR 1 and the HARQ/CSI are jointly coded and sent, an access network device can obtain the SR 1 only after the PUCCH 1 ends, which greatly increases a latency of an uplink data service. Therefore, the SR 1 is transmitted via the PUCCH 2, and the HARQ/CSI is punctured for transmission, that is, transmitted in a part of the PUCCH 1 that does not overlap the PUCCH 2, or is not transmitted.

Figure 11D:
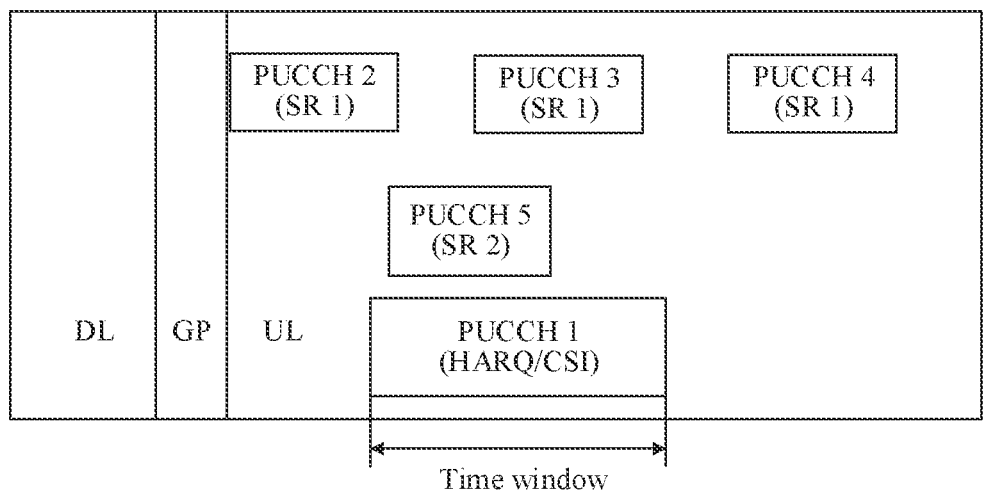
FIG. 11d is another time-domain schematic diagram of an uplink control information transmission method according to an embodiment of the present application.

Referring to FIG. 11d, a PUCCH 2, a PUCCH 3, and a PUCCH 4 separately carry an SR 1 of a same resource configuration, and a PUCCH 5 carries an SR 2 of another resource configuration. A time domain position of a PUCCH 1 overlaps time domain positions of the PUCCH 2, the PUCCH 3, the PUCCH 4, and the PUCCH 5. Therefore, an SR 1 and an SR 2 are added to a candidate SR set. The PUCCHs (the PUCCH 2, the PUCCH 3, and the PUCCH 4) carrying SR1 overlap the PUCCH 1. It can be learned that an uplink data service corresponding to the SR 1 is relatively urgent and has a relatively high priority. Therefore, the SR 1 is transmitted via the PUCCH 2, and the HARQ/CSI is punctured for transmission, that is, transmitted in a part of the PUCCH 1 that does not overlap the PUCCH 2, or is not transmitted.

Figure 11E:
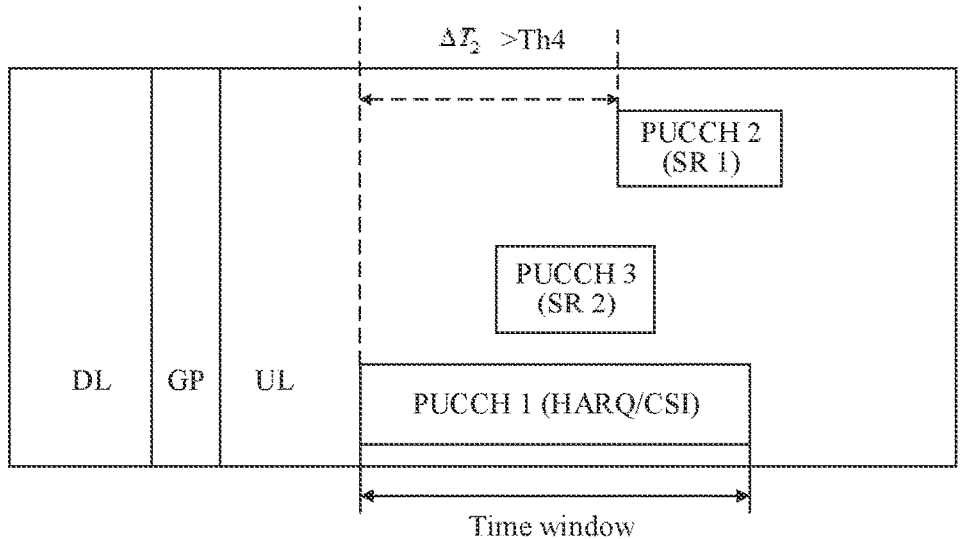
FIG. 11e is another time-domain schematic diagram of an uplink control information transmission method according to an embodiment of the present application.

Referring to FIG. 11e, time domain positions of a PUCCH 2 and a PUCCH 3 overlap a time domain position of a PUCCH 1. Therefore, an SR 1 and an SR 2 are added to a candidate SR set. Both a start moment of the PUCCH 2 and a start moment of the PUCCH 3 are later than a start moment of a PUCCH 1, but an absolute value of a difference $\Delta T_2$ between the start moment of the PUCCH 2 and the start moment of the PUCCH 1 is greater than a fourth threshold Th4. It can be learned that when the HARQ/CSI is sent, the SR 1 and the HARQ/CSI may not be jointly coded in time. Therefore, the SR 1 may be separately sent via the PUCCH 2. The HARQ/CSI is punctured for transmission, that is, transmitted in a part of the PUCCH 1 that does not overlap the PUCCH 2, or is not transmitted.

In some examples, if an access network device reserves a plurality of resource configurations for a terminal device, and a transmission conflict occurs between SRs corresponding to the plurality of resource configurations.

Figure 12:
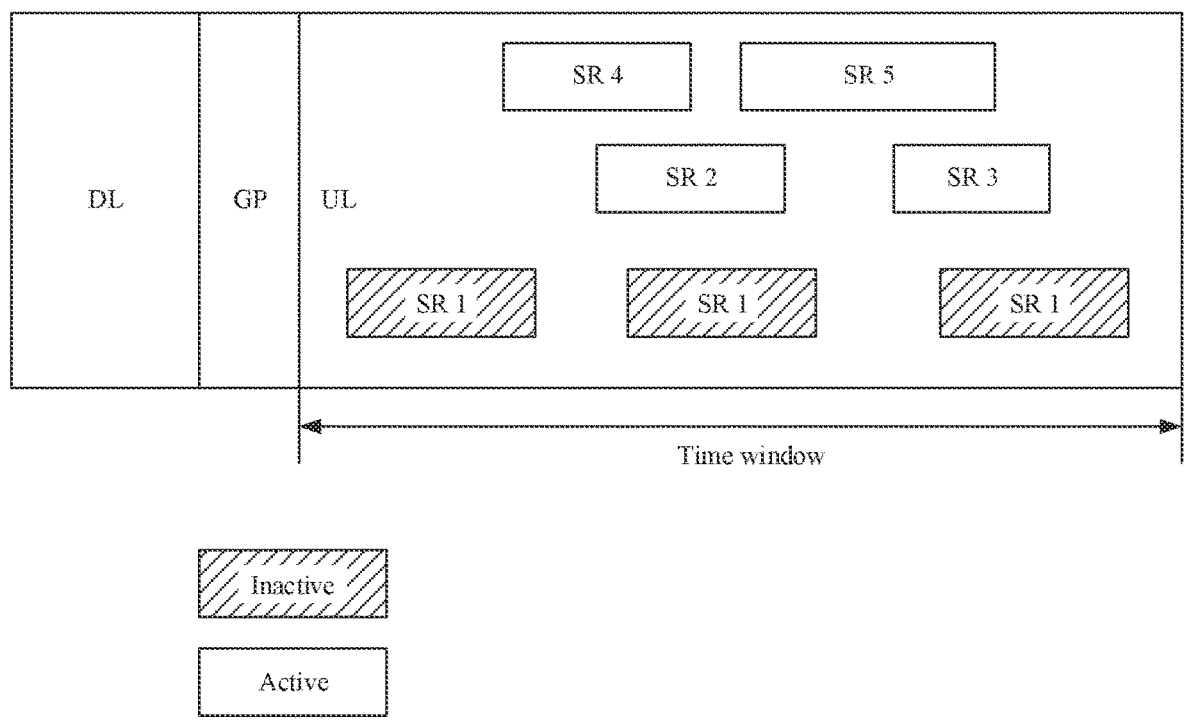
FIG. 12 is another time-domain schematic diagram of an uplink control information transmission method according to an embodiment of the present application.

Referring to FIG. 12, one slot is used as an example. It is assumed that the terminal device has SRs corresponding to five resource configurations in the slot. Specifically, an SR 1 corresponding to a first resource configuration is carried on a PUCCH 1, a PUCCH 2, and a PUCCH 3, and an SR 2 corresponding to a second resource configuration is carried on a PUCCH 4. An SR 3 corresponding to a third resource configuration is carried on a PUCCH 5, an SR 4 corresponding to a fourth resource configuration is carried on a PUCCH 6, and an SR 5 corresponding to a fifth resource configuration is carried on a PUCCH 7.

A time window is determined based on an uplink part of a current slot, where the time window is aligned with the uplink part of the slot. An SR having a PUCCH resource in the time window is selected into a candidate SR set. Referring to FIG. 12, the SR 1, the SR 2, the SR 3, the SR 4, and the SR 5 may be selected into the candidate SR set.

Then, the terminal device sends, to the access network device, an SR that is in the candidate SR set, is in a positive state, and has a highest priority, and discards another SR. For example, in the SR 1, the SR 2, the SR 3, the SR 4, and the SR 5, the SR 2, the SR 3, the SR 4, and the SR 5 are in a positive state, and the SR 2 has a highest priority. Therefore, the terminal device sends the SR 2 on the PUCCH 4 corresponding to the SR 2.

The solutions provided in the embodiments of this application are mainly described above from a perspective of interaction between nodes. It may be understood that, to implement the foregoing functions, the terminal device includes corresponding hardware structures and/or software modules for performing the functions. A person skilled in the art should easily be aware that, in combination with the examples described in the embodiments disclosed in this specification, algorithms steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the terminal device based on the foregoing method example. For example, each function module may be obtained through division corresponding to each function, or two or more functions may be integrated in one processing module. The integrated module may be implemented in a form of hardware, or may be implemented in a form of a software function module. It should be noted that, in the embodiments of this application, division into the modules is an example, and is merely a logical function division. During actual implementation, another division manner may be used.

Figure 13:
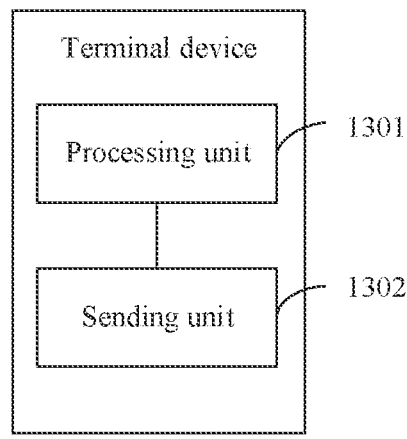
FIG. 13 is another structural block diagram of a terminal device according to an embodiment of the present application.

When each function module is obtained through division corresponding to each function, FIG. 13 is another possible schematic composition diagram of a terminal device. The terminal device may be configured to perform the functions of the terminal device in the foregoing embodiments. As shown in FIG. 13, the terminal device may include a processing unit 1301 and a sending unit 1302.

The processing unit 1301 is configured to support the terminal device in performing step 402, step 403, step 701, and step 702 in the foregoing embodiments, and/or is configured to perform another process of the technology described in this specification.

The sending unit 1302 is configured to support the terminal device in performing step 404 and step 703 in the foregoing embodiments, and/or is configured to perform another process of the technology described in this specification.

It should be noted that all related content of the steps in the foregoing method embodiments may be cited in function descriptions of corresponding function modules. Details are not described herein again. The terminal device provided in this embodiment of this application is configured to perform the uplink control information transmission method, and therefore can achieve a same effect as the uplink control information transmission method.

Figure 14:
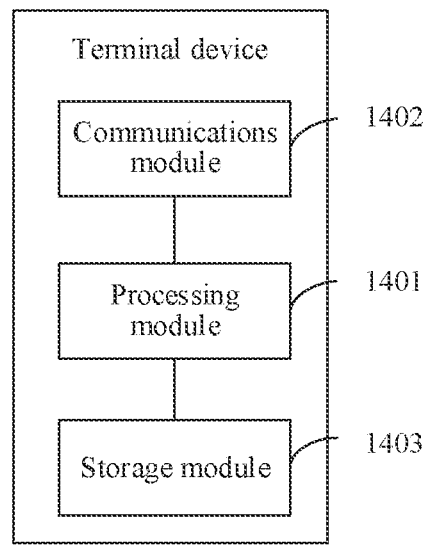
FIG. 14 is another structural block diagram of a terminal device according to an embodiment of the present application.

When an integrated unit is used, FIG. 14 shows a terminal device. The terminal device exists in a product form of a chip, and is configured to perform the functions of the terminal device in the foregoing embodiments. As shown in FIG. 14, the terminal device may include a processing module 1401 and a communications module 1402.

The processing module 1401 is configured to control and manage an action of the terminal device. For example, the processing module 1401 is configured to support the terminal device in performing step 402, step 403, step 701, and step 702, and/or is configured to perform another process of the technology described in this specification. The communications module 1402 is configured to support communication between the terminal device and another network entity, for example, support communication between the terminal device and an access network device.

Referring to FIG. 14, the terminal device may further include a storage module 1403, configured to store program code and data of the terminal device.

The processing module 1401 may be a processor or a controller. The processing module 1401 may implement or execute various example logical blocks, modules, and circuits described with reference to content disclosed in this application. Alternatively, the processor may be a combination of processors implementing a computing function, for example, a combination of one or more microprocessors or a combination of a DSP and a microprocessor. The communications module 1402 may be a communications interface, a transceiver circuit, a communications interface, or the like. The storage module 1403 may be a memory.

When the processing module 1401 is a processor, the communications module 1402 is a communications interface, and the storage module 1403 is a memory, the terminal device in this embodiment of this application may be the terminal device shown in FIG. 3.

In the embodiments of this application, function module division may be performed on the access network device based on the foregoing method example. For example, each function module may be obtained through division corresponding to each function, or two or more functions may be integrated in one processing module. The integrated module may be implemented in a form of hardware, or may be implemented in a form of a software function module. It should be noted that, in the embodiments of this application, division into the modules is an example, and is merely logical function division. During actual implementation, another division manner may be used.

Figure 15:
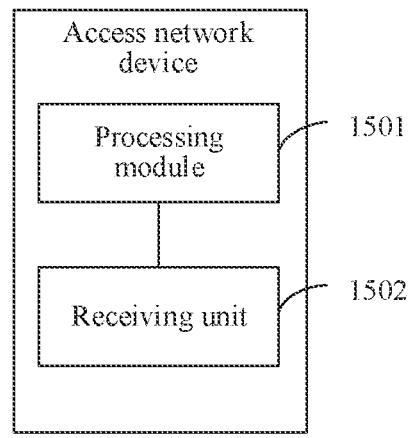
FIG. 15 is a structural block diagram of an access network device according to an embodiment of the present application.

When each function module is obtained through division corresponding to each function, FIG. 15 is a possible schematic composition diagram of an access network device. The access network device may be configured to perform the functions of the access network device in the foregoing embodiments. As shown in FIG. 15, the access network device may include a processing unit 1501 and a receiving unit 1502.

The processing unit 1501 is configured to support the access network device in performing step 405 and step 406 in the foregoing embodiments, and/or is configured to perform another process of the technology described in this specification.

The receiving unit 1502 is configured to support the access network device in performing step 404 and step 703 in the foregoing embodiments, and/or is configured to perform another process of the technology described in this specification.

It should be noted that all related content of the steps in the foregoing method embodiments may be cited in function descriptions of corresponding function modules. Details are not described herein again. The access network device provided in this embodiment of this application is configured to perform the uplink control information transmission method, and therefore can achieve a same effect as the uplink control information transmission method.

Figure 16:
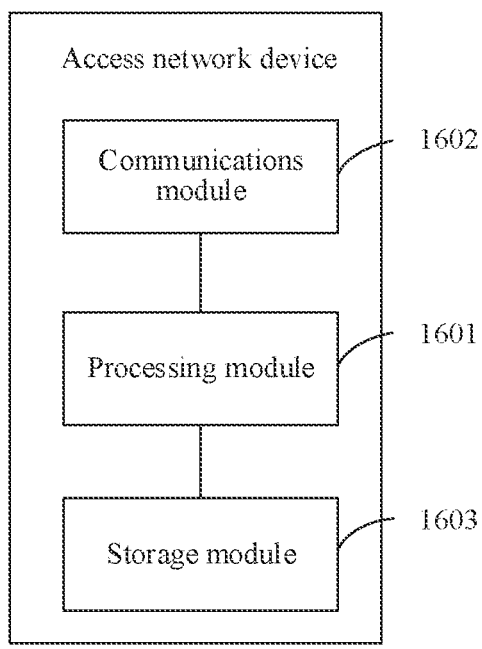
FIG. 16 is another structural block diagram of an access network device according to an embodiment of the present application.

When an integrated unit is used, FIG. 16 shows an access network device. The access network device exists in a product form of a chip, and is configured to perform the functions of the access network device in the foregoing embodiments. As shown in FIG. 16, the access network device may include a processing module 1601 and a communications module 1602.

The processing module 1601 is configured to control and manage an action of the access network device. For example, the processing module 1601 is configured to support the access network device in performing step 405 and step 406, and/or is configured to perform another process of the technology described in this specification. The communications module 1602 is configured to support communication between the access network device and another network entity. The access network device may further include a storage module 1603, configured to store program code and data of the access network device.

The processing module 1601 may be a processor or a controller. The processing module 1601 may implement or execute various example logical blocks, modules, and circuits described with reference to content disclosed in this application. Alternatively, the processor may be a combination of processors implementing a computing function, for example, a combination of one or more microprocessors or a combination of a DSP and a microprocessor. The communications module 1602 may be a communications interface, a transceiver circuit, a communications interface, or the like. The storage module 1603 may be a memory.

Figure 17:
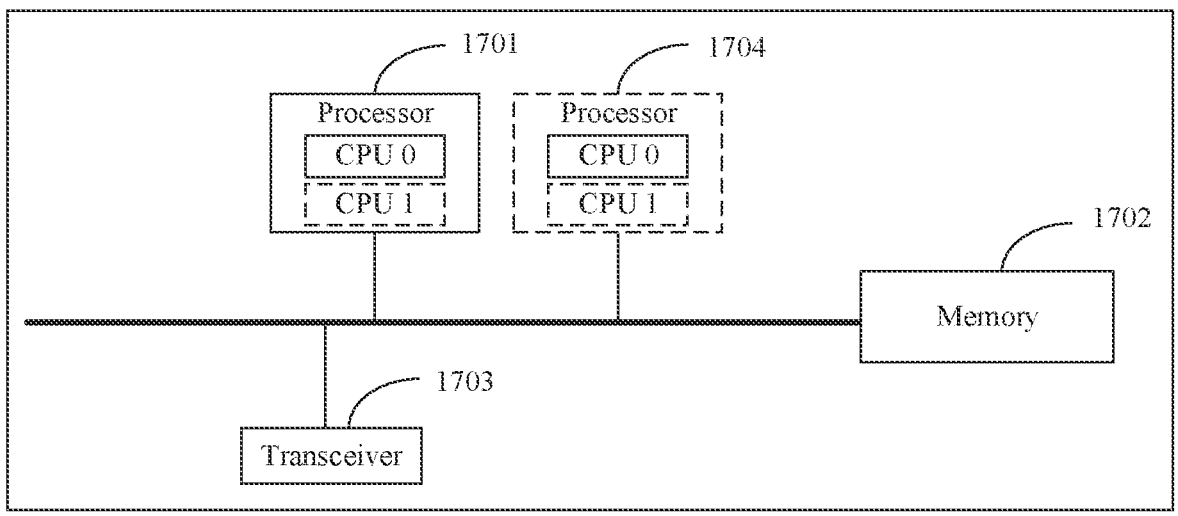
FIG. 17 is another structural block diagram of an access network device according to an embodiment of the present application.

When the processing module 1601 is a processor, the communications module 1602 is a communications interface, and the storage module 1603 is a memory, the access network device in this embodiment of this application may be the access network device shown in FIG. 17.

As shown in FIG. 17, the access network device may include at least one processor 1701, a memory 1702, and a transceiver 1703.

The following describes each component of the access network device in detail with reference to FIG. 17.

The processor 1701 is a control center of the access network device, and may be one processor, or may be a collective term for a plurality of processing elements. For example, the processor 1701 is a CPU, or may be an ASIC, or one or more integrated circuits configured to implement this embodiment of the present application, for example, one or more DSPs or one or more FPGAs.

The processor 1701 may perform various functions of the access network device by running or executing a software program stored in the memory 1702 and invoking data stored in the memory 1702.

During specific implementation, in an embodiment, the processor 1701 may include one or more CPUs, for example, a CPU 0 and a CPU 1 shown in FIG. 17.

During specific implementation, in an embodiment, the access network device may include a plurality of processors, for example, the processor 1701 and a processor 1704 shown in FIG. 17. Each of the processors may be a single-core processor (single-CPU) or may be a multi-core processor (multi-CPU). The processor herein may refer to one or more access network devices, circuits, and/or processing cores configured to process data (for example, a computer program instruction).

The memory 1702 may be a ROM or another type of static storage access network device that can store static information and instructions, or a RAM or another type of dynamic storage access network device that can store information and instructions, or may be an EEPROM, a CD-ROM or another compact disc storage medium, an optical disc storage medium (including a compact disc, a laser disc, an optical disc, a digital versatile disc, a blue-ray disc, or the like), a magnetic disk storage medium or another magnetic storage access network device, or any other medium that can be used to carry or store expected program code in a form of an instruction or a data structure and that can be accessed by a computer, but is not limited thereto. The memory 1702 may exist independently, or may be connected to the processor 1701. The memory 1702 may alternatively be integrated with the processor 1701.

The memory 1702 is configured to store the software program for executing the solutions in the present application, and the execution is controlled by the processor 1701.

The transceiver 1703 is configured to communicate with another access network device such as the terminal device in FIG. 3 by using any access network device such as a transceiver, and may be further configured to communicate with a communications network such as the Ethernet, a RAN, or a WLAN. The transceiver 1703 may include a receiving unit for implementing a receiving function and a sending unit for implementing a sending function.

A structure of the access network device shown in FIG. 17 does not constitute a limitation on an access network device, and the access network device may include components more or fewer than those shown in the figure, or may combine some components, or may have different component arrangements.

By using the foregoing descriptions of the implementations, a person skilled in the art may clearly understand that, for the purpose of convenient and brief description, division into the foregoing function modules is used as an example for description. During actual application, the foregoing functions may be allocated to different function modules and implemented based on a requirement. That is, an inner structure of an apparatus is divided into different function modules to implement all or some of the functions described above.

In the several embodiments provided in this application, it should be understood that the disclosed apparatuses and methods may be implemented in other manners. For example, the apparatus embodiments described above are merely examples. For example, division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed in different places. Some or all of the units may be selected based on an actual requirement to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

If the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of this application, but the protection scope of this application is limited thereto. Any variation or replacement in the technical scope disclosed in this application shall fall in the protection scope of this application. Therefore, the protection scope of this application shall be subject to the protection scope of the claims.

The invention claimed is:

1. A communications apparatus, comprising at least one processor and a memory, wherein
   the memory is configured to store computer executable instructions; and
   the at least one processor is configured to execute the computer executable instructions stored in the memory, to cause the communications apparatus to perform following:
   determining a time domain position of a first physical uplink control channel (PUCCH);
   determining a time domain position of a second PUCCH, wherein the time domain position of the second PUCCH overlaps the time domain position of the first PUCCH; and
   receiving, from a terminal device, a second uplink control information (UCI) on the second PUCCH without receiving a first UCI on the first PUCCH, and the second UCI comprising a scheduling request (SR), the first UCI comprising hybrid automatic repeat request (HARQ) information; and
   wherein a priority of the second UCI is higher than a priority of the first UCI, the priority of the second UCI is a priority of a resource configuration corresponding to the second UCI, and the priority of the second UCI is greater than or equal to a first threshold.

2. The apparatus according to claim 1, wherein receiving the second UCI on the second PUCCH without receiving the first UCI on the first PUCCH comprises:
receiving the second UCI on the second PUCCH without receiving transmission on the first PUCCH.

3. The apparatus according to claim 1, wherein receiving the second UCI on the second PUCCH without receiving the first UCI on the first PUCCH comprises:
receiving the second UCI on the second PUCCH without receiving the first PUCCH.

4. The apparatus according to claim 1, wherein the SR is a positive SR.

5. The apparatus according to claim 1, wherein the priority of the resource configuration is configured by a higher layer signaling or predefined.

6. A method comprising:
determining a time domain position of a first physical uplink control channel (PUCCH);
determining a time domain position of a second PUCCH, wherein the time domain position of the second PUCCH overlaps the time domain position of the first PUCCH; and
receiving, from a terminal device, a second uplink control information (UCI) on the second PUCCH without receiving a first UCI on the first PUCCH, and the second UCI comprising a scheduling request (SR), the first UCI comprising hybrid automatic repeat request (HARQ) information; and
wherein a priority of the second UCI is higher than a priority of the first UCI, the priority of the second UCI is a priority of a resource configuration corresponding to the second UCI, and the priority of the second UCI is greater than or equal to a first threshold.

7. The method according to claim 6, wherein receiving the second UCI on the second PUCCH without receiving the first UCI on the first PUCCH comprises:
receiving the second UCI on the second PUCCH without receiving transmission on the first PUCCH.

8. The method according to claim 6, wherein receiving the second UCI on the second PUCCH without receiving the first UCI on the first PUCCH comprises:
receiving the second UCI on the second PUCCH without receiving the first PUCCH.

9. The method according to claim 6, wherein the SR is a positive SR.

10. The method according to claim 6, wherein the priority of the resource configuration is configured by a higher layer signaling or predefined.

11. A non-transitory computer-readable media, storing computer instructions that, when executed by one or more processors, cause the one or more processors to perform:
determining a time domain position of a first physical uplink control channel (PUCCH);
determining a time domain position of a second PUCCH, wherein the time domain position of the second PUCCH overlaps the time domain position of the first PUCCH; and
receiving, from a terminal device, a second uplink control information (UCI) on the second PUCCH without receiving a first UCI on the first PUCCH, and the second UCI comprising a scheduling request (SR), the first UCI comprising hybrid automatic repeat request (HARQ) information; and
wherein a priority of the second UCI is higher than a priority of the first UCI, the priority of the second UCI is a priority of a resource configuration corresponding to the second UCI, and the priority of the second UCI is greater than or equal to a first threshold.

12. The non-transitory computer-readable media according to claim 11, wherein receiving the second UCI on the second PUCCH without receiving the first UCI on the first PUCCH comprises:
receiving the second UCI on the second PUCCH without receiving transmission on the first PUCCH.

13. The non-transitory computer-readable media according to claim 11, wherein receiving the second UCI on the second PUCCH without receiving the first UCI on the first PUCCH comprises:
receiving the second UCI on the second PUCCH without receiving the first PUCCH.

14. The non-transitory computer-readable media according to claim 11, wherein the SR is a positive SR.

15. The non-transitory computer-readable media according to claim 11, wherein the priority of the resource configuration is configured by a higher layer signaling or predefined.

* * * * *

UNITED STATES PATENT AND TRADEMARK OFFICE
CERTIFICATE OF CORRECTION

PATENT NO. : 11,419,135 B2
APPLICATION NO. : 17/195014
DATED : August 16, 2022
INVENTOR(S) : Li It is certified that error appears in the above--identified patent and that said Letters Patent is hereby corrected as shown below:

In the Specification

In the Detailed Description of Illustrative Embodiments, Column 40, Line 36; delete "FIG. boa" and insert --FIG. 10a--.

In the Detailed Description of Illustrative Embodiments, Column 40, Line 49; delete "FIG. boa" and insert --FIG. 10a--.

In the Detailed Description of Illustrative Embodiments, Column 40, Line 51; delete "pails" and insert --parts--.

In the Detailed Description of Illustrative Embodiments, Column 40, Line 52; delete "FIG. boa" and insert --FIG. 10a--.

In the Detailed Description of Illustrative Embodiments, Column 40, Line 66; delete "FIG. boa" and insert --FIG. 10a--.

In the Detailed Description of Illustrative Embodiments, Column 41, Line 17; delete "FIG. we" and insert --FIG. 10c--.

In the Detailed Description of Illustrative Embodiments, Column 41, Line 67; delete "i-bit" and insert --1-bit--.

In the Detailed Description of Illustrative Embodiments, Column 42, Line 3; delete "i-bit" and insert --1-bit--.

In the Detailed Description of Illustrative Embodiments, Column 42, Line 55; delete "$\lceil \log_2(1+44) \rceil = 3$" and insert --$\lceil \log_2(1+4) \rceil = 3$--.

Signed and Sealed this
Twenty-fifth Day of October, 2022

Katherine Kelly Vidal
*Director of the United States Patent and Trademark Office*

CERTIFICATE OF CORRECTION (continued)
U.S. Pat. No. 11,419,135 B2

In the Detailed Description of Illustrative Embodiments, Column 42, Lines 59-60; delete "'001','ow', 'on', and '100'" and insert --'001', '010', '011', and '100'--.

In the Detailed Description of Illustrative Embodiments, Column 44, Line 26; delete "C2=C0+2" and insert --c2=c0+2--.

In the Detailed Description of Illustrative Embodiments, Column 45, Line 1; delete "SR1" and insert --SR 1--.

In the Detailed Description of Illustrative Embodiments, Column 45, Line 5; delete "SR1" and insert --SR 1--.

In the Detailed Description of Illustrative Embodiments, Column 45, Line 8; delete "SR1" and insert --SR 1--.